US012205021B1

United States Patent
Aravabhumi et al.

(10) Patent No.: US 12,205,021 B1
(45) Date of Patent: Jan. 21, 2025

(54) SYSTEMS AND METHODS FOR ANALYZING A TECHNICAL EVENT

(71) Applicant: STATE FARM MUTUAL AUTOMOBILE INSURANCE COMPANY, Bloomington, IL (US)

(72) Inventors: Kalpana Aravabhumi, Normal, IL (US); Leah Garcia, Hudson, IL (US); Michael Shawn Jacob, Le Roy, IL (US); Oscar Allan Arulfo, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 1195 days.

(21) Appl. No.: 16/932,166

(22) Filed: Jul. 17, 2020

(51) Int. Cl.
  *G06N 3/08* (2023.01)
  *G06F 9/54* (2006.01)
  *G06F 16/28* (2019.01)

(52) U.S. Cl.
  CPC ............... *G06N 3/08* (2013.01); *G06F 9/542* (2013.01); *G06F 16/285* (2019.01)

(58) Field of Classification Search
  CPC .............. G06N 3/02; G06N 3/04; G06N 3/08; G06N 20/00; G06N 20/10; G06N 20/20; G06F 9/542; G06F 16/285
  See application file for complete search history.

(56) References Cited

U.S. PATENT DOCUMENTS

| | | | |
|---|---|---|---|
| 9,313,091 B1 | 4/2016 | Schnegelberger et al. | |
| 9,606,904 B1 | 3/2017 | Chang et al. | |
| 9,665,826 B2 | 5/2017 | Jain et al. | |
| 2017/0372231 A1 | 12/2017 | Ghatage et al. | |
| 2018/0068228 A1* | 3/2018 | Rawlings | G06N 7/01 |
| 2020/0074078 A1* | 3/2020 | Saxe | H04L 63/1408 |
| 2020/0159916 A1* | 5/2020 | Nguyen | G06F 11/3072 |
| 2021/0383206 A1* | 12/2021 | Teppoeva | G06F 11/004 |

FOREIGN PATENT DOCUMENTS

WO  WO-2017/218872 A1  12/2017

OTHER PUBLICATIONS

Facebook, "Finding and fixing software bugs automatically with SapFix and Sapienz" (2018). Retrieved on Jul. 17, 2020, URL: <https://engineering.fb.com/developer-tools/finding-and-fixing-software-bugs-automatically-with-sapfix-and-sapienz/>.
Google Cloud, "Error Reporting" (2019). Retrieved on Jul. 17, 2020, URL: <https://cloud.google.com/error-reporting/>.

* cited by examiner

*Primary Examiner* — Shane D Woolwine
(74) *Attorney, Agent, or Firm* — MARSHALL, GERSTEIN & BORUN LLP

(57) ABSTRACT

Systems and methods are described for analyzing information relating to technical events associated with client devices in an organization (e.g., hardware and/or software malfunctions or performance inefficiencies originating at a client device or elsewhere in an organizational computing system). Particularly, machine learning techniques may use one or more trained artificial neural networks to classify technical events. Classifications of technical events may include, for example, causes of technical events, identifications of other affected devices, and/or steps for resolving technical events. Additionally, systems and methods are described for analyzing information relating to organizational ideas conceived of by client device users within the organization.

20 Claims, 14 Drawing Sheets

SYSTEMS AND METHODS FOR ANALYZING A TECHNICAL EVENT

FIELD

The present disclosure generally relates to systems and methods for facilitating troubleshooting of client electronic computing devices and other computing devices in organizations, and more particularly, to machine learning techniques for automatic classification of software issues and/or hardware issues relating to computing devices in an organization.

BACKGROUND

Many modern organizations, such as insurance companies, financial institutions, and other large enterprises, include a vast number of persons, computing devices, and software applications integral to the functions of the organization. The operations of an insurance company, for example, may include a number of insurance agents, business support staff, and technical support staff, each of whom may perform their roles via various client computing devices, including desktop computers, laptop computers, smartphones, tablets, etc. Performance of the organization's functions is often facilitated via various software applications, such as email applications, document creation and processing applications, web browser applications, and proprietary and/or third-party business applications. Accordingly, the organization also typically utilizes a number of network hardware devices (routers, modems, wireless access points, etc.), as well as servers that facilitate the functions of the aforementioned computing devices of the organization.

In organizations of such scale, it is expected that persons within the organization will encounter a variety of issues relating to hardware and/or software used by the organization. As an example, an insurance agent may experience a hardware malfunction of their desktop or laptop computer, or a bug in a software application. As another example, a malfunction of one or more servers or network devices (or inefficient performance thereof) may interfere with operation of essential applications relied upon by a number of persons within the organization. Significant resources are saved within the organization when such issues are identified, diagnosed, and resolved quickly and effectively. However, in organizations of scale, inefficiencies are introduced in the acquisition of information relating to hardware/software malfunctions, as well as in the identification and resolution of root causes of such malfunctions. For example, such malfunctions may typically be reported en masse to technical support staff with the expectation that the technical support staff can identify and resolve the root causes of all malfunctions. However, information included in a report of a malfunction can often be insufficient for the support staff to identify a root cause. Additionally, the technical expertise of the support staff may vary, and thus not all technical support staff may be equally suited to identify and/or resolve the wide array of hardware and software issues that might be encountered in the organization. Still additionally, for at least similar reasons, technical support staff may fail to identify recurrences or patterns of hardware and/or software issues encountered in the organization.

Analogous problems are encountered when a person within the organization seeks to contribute an idea that may be useful in improving the functions or performance of software, hardware, business processes, and/or other aspects of the organization. That is, particularly in a large organization, existing techniques may be insufficient for such ideas to be classified and directed to appropriate entities across the organization.

Accordingly, there is a need for improved computing systems and methods capable of acquiring, analyzing, and distributing information relating to a technical events associated with client computing devices in an organization (e.g., hardware and/or software malfunctions), as well as ideas raised by persons within the organization.

SUMMARY

The present application discloses techniques by which information relating to technical events associated with client electronic computing devices (e.g., hardware and/or software malfunctions or performance inefficiencies originating at a client device or elsewhere in an organizational computing system) may be acquired and automatically analyzed to facilitate proper diagnosis and resolution of technical events. Particularly, machine learning techniques may use one or more trained artificial neural networks to classify technical events. Classifications of technical events may include, for example, a cause or source of a technical event, an identification of a particular entity best suited to handle the technical event (e.g., particular server or technical staff), an identification of other devices affected by the technical event, a priority level associated with resolving a technical event, and/or an identification of additional information that would enable further analysis and classification of the technical event. Additionally, the present application discloses techniques by which information relating to ideas raised by persons within an organization may be acquired and automatically analyzed via one or more artificial neural networks.

In an embodiment, a computer-implemented method may be provided for analyzing information relating to a technical event associated with a client computing device. The method may include (1) training, by one or more processors and using labeled training data indicative of events associated with client computing devices, one or more artificial neural networks to classify technical events based upon at least one of user-generated information or system-generated information associated with technical events, (2) obtaining, by the one or more processors and via an event capture application executing at a client computing device, an indication of an occurrence of a technical event associated with the client computing device, (3) based upon the occurrence of the technical event, obtaining, by the one or more processors, information relating to the technical event, the obtained information including information generated by at least one of (i) the client computing device or (ii) a user of the client computing device, and/or (4) determining, by the one or more processors, one or more classifications of the technical event, at least by processing the obtained information using the one or more trained artificial neural networks. The computer-implemented method may include additional, fewer, and/or alternate actions, including actions described herein.

In another embodiment, a computing system may be configured to analyze information relating to a technical event associated with a client computing device. The computing system may include one or more processors, and one or more memories storing non-transitory computer executable instructions that, when executed by the one or more processors, cause the computing system to (1) train, using labeled training data indicative of events associated with client computing devices, one or more artificial neural networks to classify technical events based upon at least one of user-generated information or system-generated information associated with technical events, (2) obtain, via an event capture application executing at a client computing device, an indication of an occurrence of a technical event associated with the client computing device, (3) based upon the occurrence of the technical event, obtain information relating to the technical event, the obtained information including information generated by at least one of (i) the client computing device or (ii) a user of the client computing device, and/or (4) determine one or more classifications of the technical event, at least by processing the obtained information using the one or more trained artificial neural networks. The computing system may include additional, fewer, and/or alternate computing components including components described herein, and may be configured to perform additional, fewer, and/or alternate actions, including those described herein.

In yet another embodiment, one or more non-transitory computer-readable media may store non-transitory computer-executable instructions that, when executed by one or more processors, cause one or more computers to (1) train, using labeled training data indicative of events associated with client computing devices, one or more artificial neural networks to classify technical events based upon at least one of user-generated information or system-generated information associated with technical events, (2) obtain, via an event capture application executing at a client computing device, an indication of an occurrence of a technical event associated with the client computing device, (3) based upon the occurrence of the technical event, obtain information relating to the technical event, the obtained information including information generated by at least one of (i) a client computing device or (ii) a user of the client computing device, and/or (4) determine one or more classifications of the technical event, at least by processing the obtained information using the one or more trained artificial neural networks. The one or more non-transitory computer-readable media may store additional, fewer, and/or alternate instructions, including those described herein.

BRIEF DESCRIPTION OF THE DRAWINGS

The figures described below depict various aspects of the applications, methods, and systems disclosed herein. It should be understood that each figure depicts an embodiment of one or more particular aspects of the disclosed applications, systems and methods, and that each of the figures is intended to accord with one or more possible embodiments thereof. Furthermore, wherever possible, the following description refers to the reference numerals included in the following figures, in which identical or functionally similar elements are depicted with like reference numerals.

DETAILED DESCRIPTION

Figure 1:
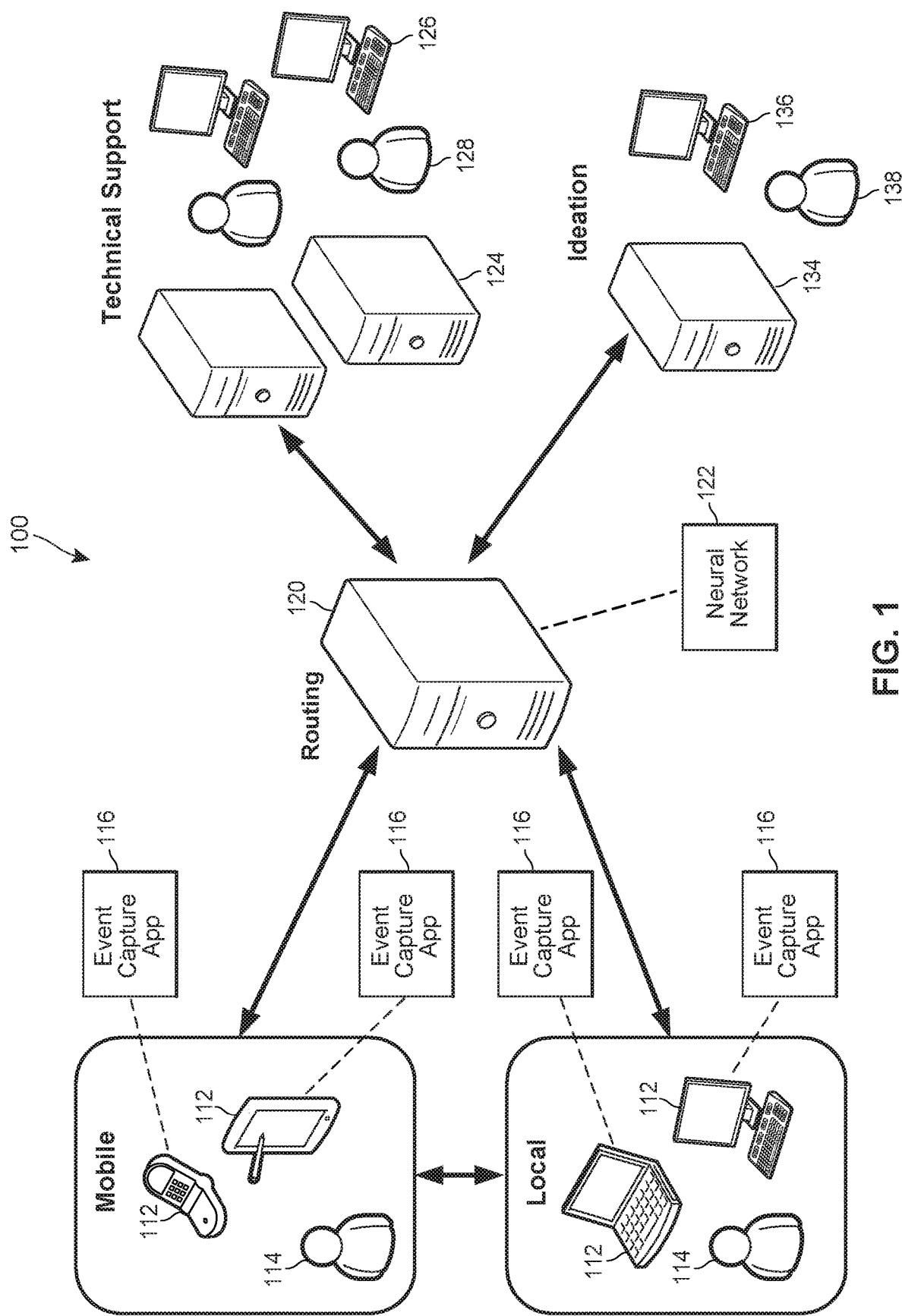
FIG. 1 illustrates an example computing environment in which techniques of this disclosure may be implemented, in accordance with some embodiments.

The systems and methods described herein, at a high level, provide for automatic analysis and handling of technical events associated with client electronic computing devices ("client devices") in an organization. Technical events addressed herein may include, for example, hardware and/or software malfunctions or performance inefficiencies occurring at a client device or occurring elsewhere in an organizational computing system (e.g., malfunctions of servers or network equipment, which may affect operations of client devices). Technical events may be analyzed, for example, based upon user-generated information relating to technical events (e.g., text or audio description of technical events, provided by respective users via interactive user interfaces described herein), and/or based upon system-generated information relating to technical events (e.g., system state information associated with operation of the client devices, servers, network hardware, etc., at or near times at which technical events occurred).

Machine learning techniques may be used to construct one or more artificial neural networks for classifying technical events associated with client devices. Classifying technical events may include, for example, via one or more servers, (1) identifying a source or root cause of a technical event (e.g., identifying a root issue with hardware or software of the client device or another computing entity in the organization), (2) identifying one or more steps to be performed based upon the technical event (e.g., restarting a client device, deleting cache memory at a client device, rebooting a server, other remedial steps to be performed by users/administrators/devices, etc.), (3) identifying another computing entity to which the technical event is to be directed, (e.g., another server or staff workstation best equipped to handle the technical event), (4) identifying additional information needing to be collected to further analyze the technical event (e.g., additional diagnostic information needing to be obtained from client devices, servers, network equipment, etc., or requesting for the user to provide audio or text describing the technical event as experienced by the user), (5) determining a "reach" of the technical event in the organization (e.g., by identifying other client devices or servers affected by the same or related technical issues), and/or (6) assigning a priority to the technical event (e.g., based upon the reach of the technical event, and/or based upon the severity of the technical event experienced at a particular client device). Additional or alternative classifications of technical events may emerge from operation of the one or more artificial neural networks, in various embodiments.

To train the one or more artificial neural networks, labeled training data may be provided, where the labeled training data includes user-generated and/or system-generated information describing past technical events having known classifications (e.g., software or hardware issues having known sources, remedial steps or other steps to be performed, reach, priority, etc.). After the one or more artificial neural networks have been trained, data indicative of new technical events (e.g., user-generated or system-generated information describing the technical event) may be provided to the one or more trained artificial neural networks. The one or more trained artificial neural networks may analyze the input data to apply one or more classifications to the new technical event(s).

In some embodiments, an "event capture application" is executed at client devices in the organization. Users of the client devices may utilize the event capture application to cause user-generated information and/or system-generated information relating to the technical event to be captured (e.g., by recording text and/or audio, and/or by using interactive controls to cause system state information to be obtained by the client device and/or other devices in the organization). Captured information may be provided to the one or more artificial neural networks, for example by transmitting the captured information over one or more networks to one or more servers that implement the one or more artificial neural networks. Classifications of technical events may be provided back to the event capture application at client devices, such that users can view information associated with technical events reported by respective users (e.g., status information, sources of hardware/software issues, remedial steps, etc.).

In some embodiments, similar systems and methods may be utilized to analyze ideas provided by users within the organization. For example, one or more artificial neural networks may be trained to classify organizational ideas (e.g., by topic or organizational team to which the idea is directed) based upon labeled training data indicative of past ideas (e.g., including user-generated information such as text or audio describing the idea). The one or more trained artificial neural networks may then receive data indicative of new organizational ideas (e.g., via the event capture application), and automatically determine one or more classifications of each new idea.

As will be described herein, the described systems and methods provide a number of technical benefits. For example, systems and methods described herein improve the acquisition and distribution of information relating to technical events occurring across a potentially large number of computing devices in an organization. Furthermore, the systems and methods described herein improve the techniques via which software and hardware issues relating to client devices are diagnosed and remedied. Still further, the systems and methods herein may improve the function of client devices (e.g., client device hardware and/or software), and/or larger organizational computing systems by facilitating the identification/diagnosis and resolution of software and/or hardware issues particular to the client devices and/or larger computing systems.

Example Computing Environment

FIG. 1 illustrates a block diagram of an example computing environment 100 via which techniques described herein may be implemented. At a high level, the computing environment 100 includes a number of "front-end" client electronic computing devices 112, each of which may be operated by one or more users 114 (e.g., persons within an organization). Users 114 may use respective client devices 112 to access a number of software applications executing by the client devices 112, the applications being configured to facilitate various operations of an organization (e.g., email application, web browser application, business software application(s), document creation/processing applications, other proprietary applications, etc.).

The client devices 112 may include various electronic devices that may be utilized in an organization, such as smartphones, tablets, laptop computers, desktop computers, wearable electronic devices, and/or other suitable computing devices. The client devices 112 as described herein may include a combination of "local" client devices (e.g., physically located and/or fixedly connected within a local premises of an organization) and "mobile" client devices (e.g., physically carried within the premises by users 114, and/or remotely connected to the organizational network from outside of the organization's base of operations).

An event capture application 116 ("Event Capture App"), with independent instances executing at each of one or more of the client devices 112, may operate to detect technical events associated with the respective client devices 112. The event capture application 116 executing at a client device 112 may obtain user-generated information associated with a technical event (e.g., audio and/or text description of the technical event, as experienced by a user 114 of the client device 112). Additionally or alternatively, the event capture application 116 may obtain system-generated information associated with the technical event (e.g., system state information associated with the technical event, examples of which will be provided herein).

The event capture application 116 may cause the obtained information relating to a technical event to be transmitted to other "back-end" computing entities which may implement one or more artificial neural networks as described herein. Back-end computing entities may include one or more routing servers 120 which, in some embodiments, may implement at least a portion of an artificial neural network 122. The back-end computing entities may further include one or more technical support servers 124, and/or one or more technical support workstations 126 operated by one or more technical staff 128, which may collectively function to diagnose and/or resolve technical events relayed by the routing server(s) 120. In some embodiments, respective ones of the technical support servers 124, workstations 126, and/or staff 128 may be designated for diagnosing and/or resolving particular types or categories of technical events, such as events relating to particular software applications and/or hardware components or particular other technical events (e.g., particular operational inefficiencies such as slow application loading times or slow query response times). In some embodiments, each of the one or more technical support servers 124 may implement a respective one or more artificial neural networks, e.g., to intelligently analyze a respective portion of technical events directed to the one or more technical support servers 124 by the routing server(s) 120. Additionally or alternatively, in some embodiments, functionalities of a single neural network may be distributed among the routing server(s) 120 and/or one or more technical support servers 124.

Additionally or alternatively, back-end computing entities may include ideation servers 134 and/or ideation workstations 136 operated by one or more ideation staff 138, which may collectively function to handle information relating to organizational ideas routed by the routing server(s) 120. In some embodiments, each of the one or more ideation servers 134 may implement a respective one or more artificial neural networks, e.g., to intelligently analyze data indicative of respective subsets of organizational ideas, the portions of data being provided by the routing server(s) 120. Additionally or alternatively, in some embodiments, functionalities of a single artificial neural network may be distributed among the routing server(s) 120 and/or one or more ideation servers 134.

Communications among computing entities in the environment 100, as represented via bidirectional arrows, may be implemented via one or more suitable computing networks. Such one or more networks may include, for example, a local area network (LAN) and/or a wireless LAN (WLAN) implemented by an organization. Additionally or alternatively, the one or more networks may include one or more wide-area networks (WAN) implemented via the Internet and/or a cellular communications network. Combinations of computing networks may be utilized, in various embodiments. Accordingly, the environment 100 may include various additional computing hardware and/or software that may operate to implement communications among other computing entities in the environment 100 (e.g., routers, modems, network cables, firewalls, servers, etc.).

A server, when referred to herein (e.g., server 120, 124, and/or 134) may include one or more distinct servers (e.g., distributed servers in a server farm). A server as described herein may generally include a memory (i.e., one or more memories), which may include ROM, RAM, and/or other suitable types of computer memory. Non-transitory computer memory of a server may include computer-executable instructions to be executed by a processor of the server (i.e., one or more processors of the server) to perform operations thereof, as described herein.

Figure 2A:
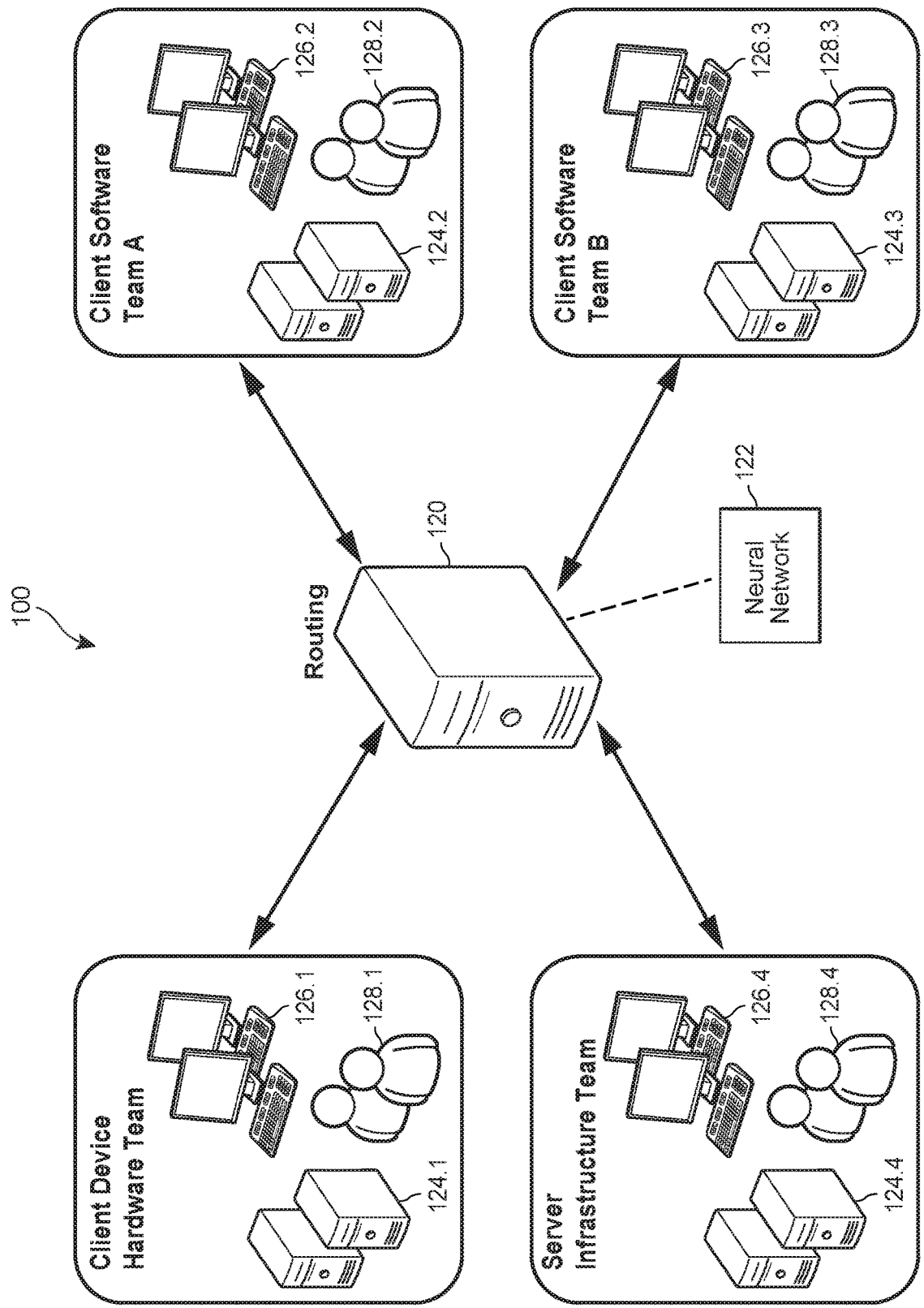
FIGS. 2A and 2B illustrate example expansions of the example computing environment of FIG. 1, in accordance with some embodiments.
Figure 2B:
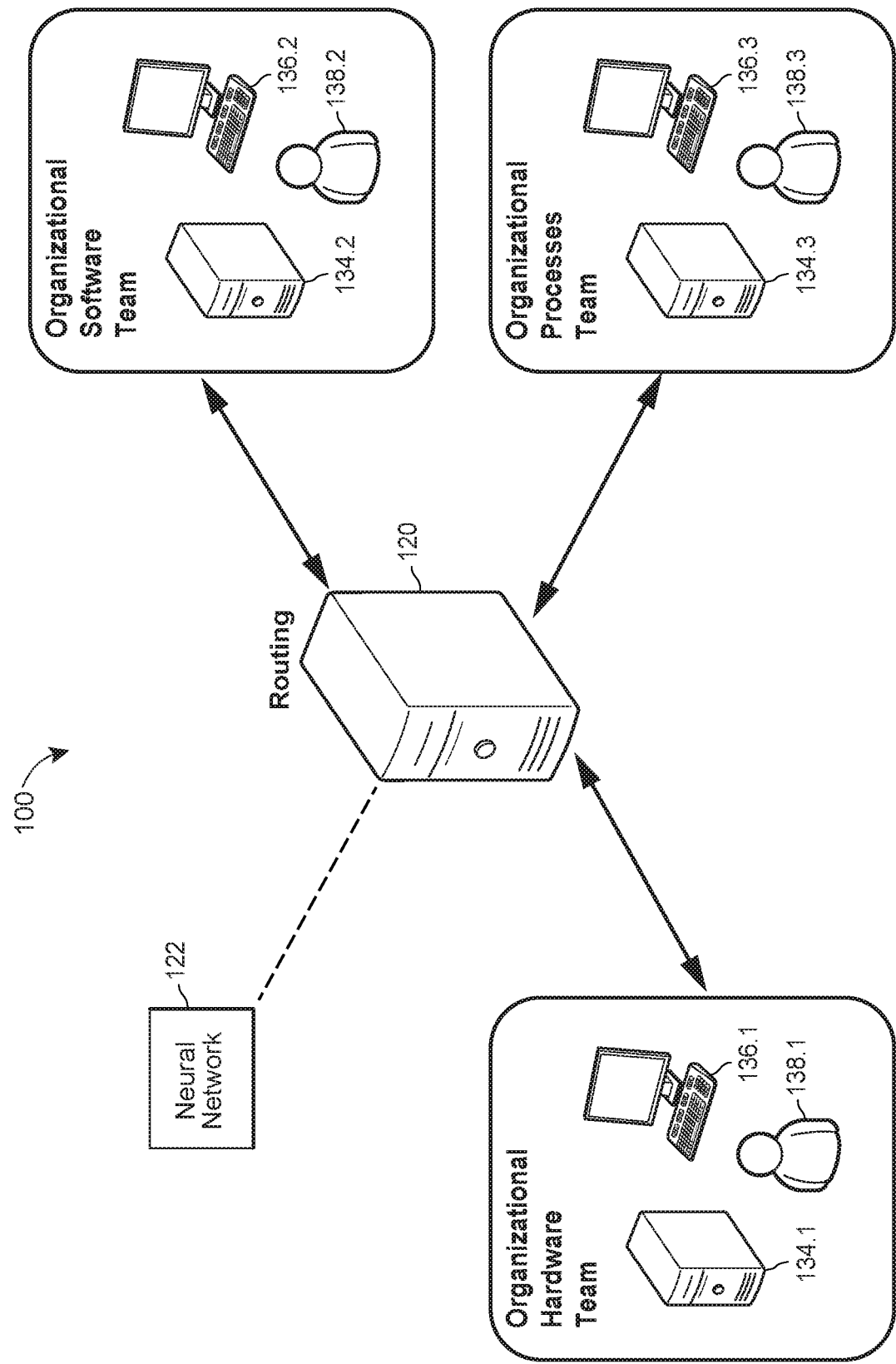

FIGS. 2A and 2B depict example expansions of the computing environment 100 as described with respect to FIG. 1. It should be understood that computing entities as depicted in FIGS. 2A and/or 2B may be used in combination with the front-end computing entities as shown in FIG. 1, in accordance with the systems and methods described herein.

FIG. 2A depicts an example expansion of the computing environment 100. Particularly, FIG. 2A depicts an extended technical support environment comprising various technical support servers 124.1-124.4 to which information associated with particular types of technical events may be provided from the routing server(s) 120. Each of the respective technical support servers 124.1-124.4 is associated with respective technical support workstations 126.1-126.4 operated by respective technical staff 128.1-128.4. The delineation of the technical support servers, workstation, and staff along these lines may facilitate informed handling of various types of technical events, including for example technical events relating to client device hardware, a first client device software application ("Client Software Team A"), a second client device software application ("Client Software Team B"), and organizational server infrastructure (e.g., servers facilitating operation of applications and/or communications among client devices in the organization). Additional, alternate, and/or fewer technical support servers, workstations, and/or staff may be envisioned, in various embodiments.

The routing server(s) 120 may implement the artificial neural network 122. Analysis of a technical event via the artificial neural network 122 may include identification of a source of the technical event and/or another classification of the technical event that associates the technical event with a particular computing device, software application, and/or hardware entity. Based upon the classification of the technical event, the routing server(s) 120 may provide the technical event (i.e., the captured information associated therewith) to one or more of the technical support servers 124.1-124.4 and/or the workstations 126.1-126.4. As an example, the routing server(s) 120 may determine that a particular technical event is caused by a software bug or performance inefficiency of a particular software application, and accordingly may direct the technical event to server(s) 124.2 and/or workstation(s) 126.2 associated with the particular software application.

In some embodiments, portions of the same artificial neural network 122 may be implemented at the technical support servers 124.1-124.4. Additionally or alternatively, in some embodiments, each of the technical support servers 124.1-124.4 may implement respective, separately trained artificial neural networks. For example, upon receiving information relating to a technical event from the routing server(s) 120, a neural network at a particular technical support server 124.1 may perform further analysis of the technical event to more particularly classify the technical event (e.g., to identify a particular hardware device as the source of the technical event). In any case, based upon the classification, the technical support server 124.1 may direct the technical event to one or more of the workstations 126.1. Additionally or alternatively, in some embodiments, the technical support server 124.1 may direct the technical event to a still further one or more servers, e.g., additional server(s) more particularly configured to handle a particular hardware or software malfunction. Thus, a hierarchical relationship among back-end computing entities may be formed, in which back-end computing entities utilize one or more separately trained artificial neural networks to perform analyses of technical events and direct the technical events to appropriate computing entities for proper handling and resolution of specific types of hardware and/or software issues in the organization.

FIG. 2B depicts another example expansion of the computing environment 100. Particularly, FIG. 2B depicts an extended ideation environment, which is generally analogous to the extended technical support environment described above with respect to FIG. 2A. The extended ideation environment includes ideation servers 134.1-134.3, which are associated with respective ideation workstations 136.1-136.3 and respective ideation staff 138.1-138.3. The delineation of the ideation servers, workstation, and staff may facilitate informed handling of various types of organizational ideas, for example ideas relating to the organization's software, hardware, and processes (e.g., business processes). Additional, alternate, and/or fewer ideation servers, workstations, and/or staff may be envisioned, in various embodiments.

Analysis of an organizational idea at the routing server(s) 120 may include determining one or more classifications for the organizational idea, based upon which the idea is provided to one or more of the ideation servers 134.1-134.3. In some embodiments, the ideation servers 134.1-134.3 may implement respective, separately trained artificial neural networks to operate upon separate portions of information relating to organizational ideas. For example, upon receiving information relating to an organizational idea from the routing server(s) 120, a neural network at the ideation server 134.1 may perform further analysis of organizational idea to more particularly classify the organizational idea (e.g., to identify a particular hardware device to which the organizational idea pertains). In any case, based upon analysis at one or more of the respective ideation servers 134.1-134.3, an organizational idea may be provided to one or more of the workstations 136.1-136.3, and/or to still further ideation servers. Thus, as with handling of technical events, a hierarchical relationship may be formed among back-end entities to facilitate handling of organizational ideas via one or more artificial neural networks. In some embodiments, a single artificial neural network may be distributed among the routing server(s) 120 and one or more of the ideation servers 134.1-134.3.

Although separate servers are described in FIGS. 2A and 2B, it should be understood that in some embodiments, the depicted servers may be a same one or more servers, wherein separate technical events and/or organizational ideas are delineated via other means (e.g., via separate databases maintained via the same one or more servers).

Example Data Flow Diagram

Figure 3:
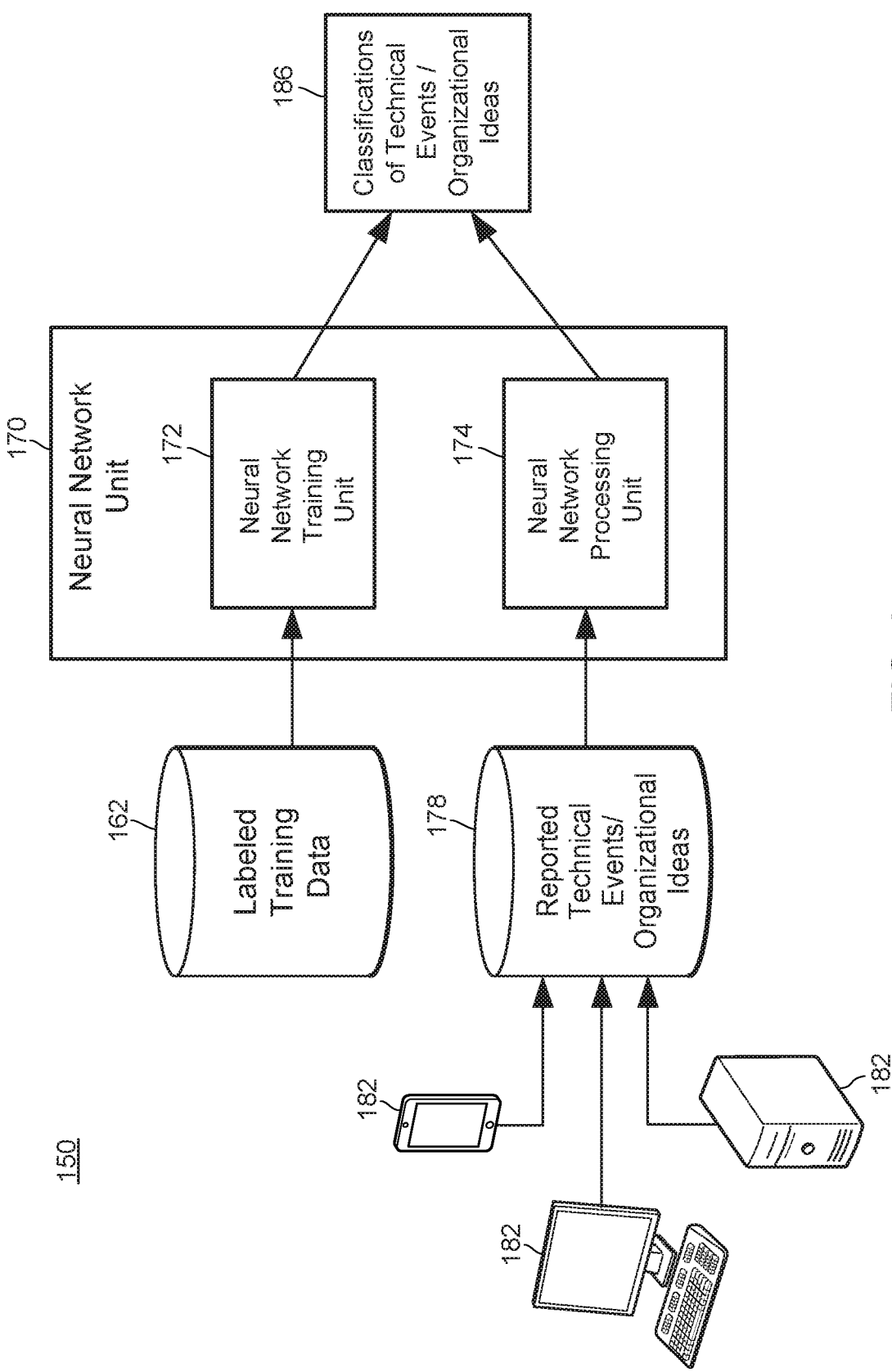
FIG. 3 illustrates a data flow diagram associated with training and utilization of one or more artificial neural networks, in accordance with some embodiments.

FIG. 3 illustrates a data flow diagram 150 showing Techniques for (1) training one or more artificial neural networks to classify technical events and/or organizational ideas, and/or (2) operating the one or more trained artificial neural networks to classify technical events and/or organizational ideas reported by users in an organization. As will be discussed herein, at least some elements of the data flow diagram 150 may correspond to elements of the computing environment 100 as described with respect to FIGS. 1, 2A, and 2B. Transmission of data described herein may be performed, for example, via various wired and/or wireless communications over one or more communications networks, including networks described herein.

Labeled training data 162 may be obtained for the purpose of training the one or more artificial neural networks. The labeled training data 162 may be obtained, for example, via client devices and/or databases stored by servers in an organization. In any case, the labeled training data includes information relating to technical events and/or organizational ideas with known classifications (e.g., known cause, priority, or reach of a technical event, known business process associated with an organizational idea, etc.). Information relating to technical events included in the labeled training data 162 may include, for example, user-generated information and/or system-generated information relating to respective technical events. "Known" classifications of events/ideas may include classifications that are manually determined by persons (e.g., without assistance of an artificial neural network, based at least in part upon the user-generated and/or system-generated information captured via one or more client devices as described herein, and/or based upon other information). Additionally or alternatively, "known" classifications of events/ideas may include classifications that are manually confirmed by persons, for example after one or more classifications are determined by a trained or partially trained artificial neural network (e.g., based upon analysis of user-generated and/or system generated information by the neural network(s)). Addition of a level of manual confirmation to classifications determined via the one or more artificial neural networks may facilitate continued training and improvement of the one or more artificial neural networks as additional technical events and/or organizational ideas are provided thereto.

The labeled training data 162 is provided to a neural network unit 170. Particularly, the labeled training data 162 is received by a neural network training unit 172 ("training unit") of the neural network unit 170. The training unit 172 may include software that is configured to receive the labeled training data 162 and use the labeled training data 162 to train one or more artificial neural networks to correctly identify classifications associated with technical events and/or organizational ideas based upon the information relating to the respective events and/or ideas (e.g., to produce "correct" outputs corresponding to the known classifications of respective events and/or ideas). The one or more neural networks may include any suitable type of computer-implemented neural networks, such as a recurrent neural network or a feed-forward neural network. Each of the one or more neural networks may comprise a plurality of nodes, also referred to herein as "neurons," arranged in a plurality of layers, and each neuron may process one or more inputs to generate one or more outputs (e.g., a decision or another value). Example neural networks and the elements thereof will be discussed further herein, in particular with regard to FIGS. 6 and 7.

Once one or more neural networks have been trained by the training unit 172, technical events and/or organizational ideas may be provided to a neural network processing unit 174 ("processing unit") of the neural network unit 170. Particularly, reported technical events and/or organizational ideas 178 (e.g., user-generated and/or system-generated information associated therewith) may be provided to the processing unit 174. The reported technical events and/or organizational ideas 178 may be received from various sources 182 in an organization, including for example client devices, workstations, and/or servers described herein (e.g., as described with respect to FIGS. 1, 2A, and/or 2B). In any case, the processing unit 178 may feed the obtained information relating to a given technical event or organizational idea to one or more trained artificial neural networks (e.g., as inputs to at least one of the one or more artificial neural networks) to produce one or more classifications 186 of the given technical event or organizational idea.

In some embodiments, at least portions of the neural network unit 170 may be disposed at servers described with respect to FIGS. 1, 2A, and/or 2B (e.g., routing server(s) 120, technical support server(s) 124, and/or ideation server(s) 134). In some embodiments, for example, the processing unit 174 may be disposed at the aforementioned server(s), while the training unit 172 may be disposed at other computing entities (e.g., other ones of the aforementioned servers and/or still other computing entities). That is, the one or more neural networks may be trained via a first system, and the one or more trained neural networks may be utilized by a second system including the computing entities of FIGS. 1, 2A, and/or 2B. Additionally or alternatively, in some embodiments, at least some functionalities of the training unit 172 and/or processing unit 174 may be disposed at each of the data sources 188.

The data flow diagram 150 may include additional, fewer, and/or alternate elements, in some embodiments. Furthermore, where appropriate, two or more of the elements of the data flow diagram 150 may be combined.

Example Client Electronic Computing Device

Figure 4:
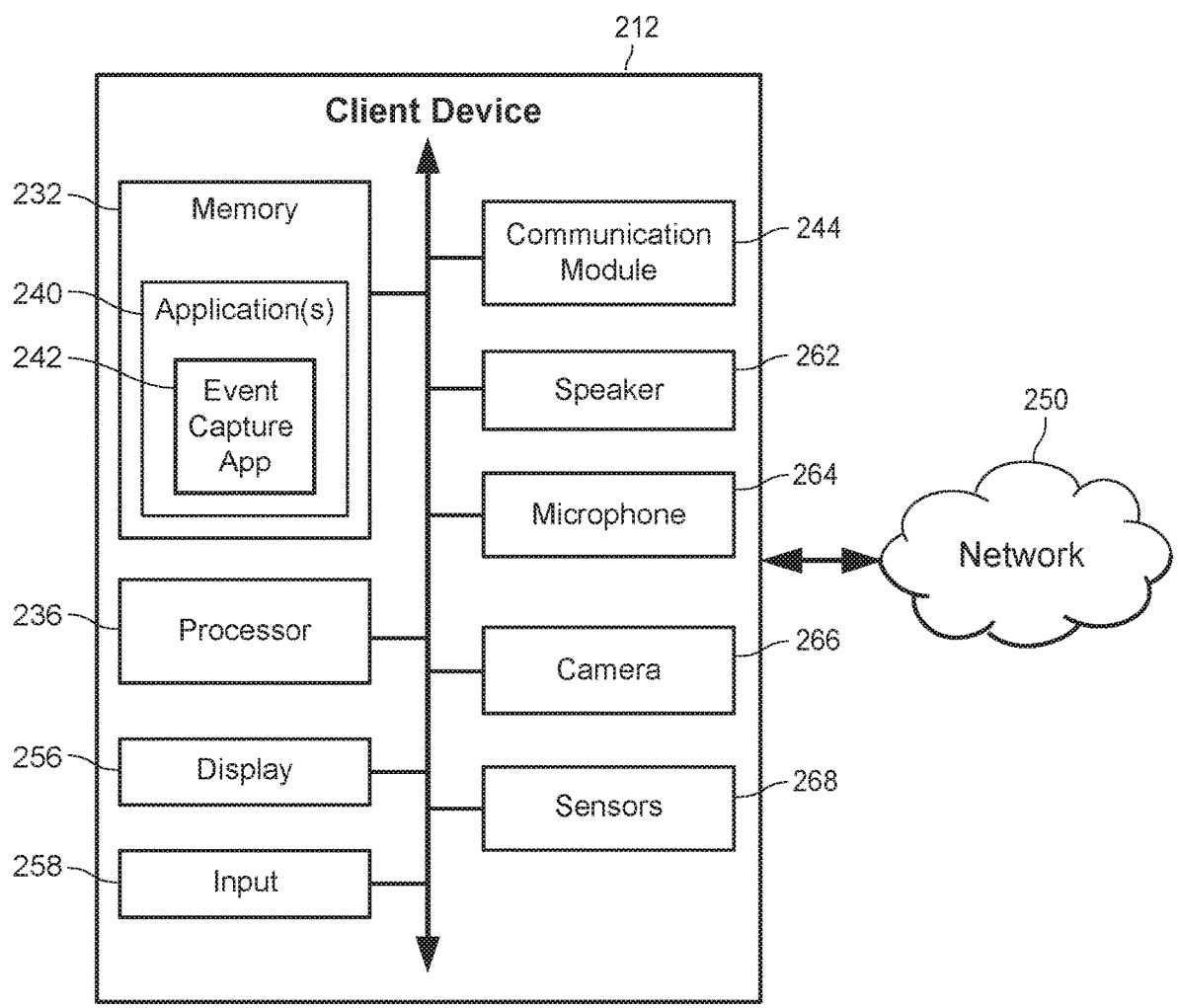
FIG. 4 illustrates a block diagram of an example client electronic computing device that may operate in the computing environment of FIG. 1, in accordance with some embodiments.

FIG. 4 illustrates a block diagram of an example client electronic computing device 212 ("client device"), which may correspond to one or more of the client devices 112 depicted in FIG. 1. At a high level, an event capture application and/or another application(s) executed by the client device 212 may detect a technical event associated with the client device 212 (e.g., originating at the client device 212 or otherwise affecting performance at the client device 212). Upon detecting the technical event, the client device 212 may obtain user-generated or system-generated information relating to the detected technical event. Upon obtaining the information relating to a technical event, the client device 212 may provide the obtained information to back-end computing entities (e.g., as described with respect to FIG. 1) to facilitate classification of the technical event using the one or more trained artificial neural networks described herein. Additionally or alternatively, in some embodiments, the client device 212 may obtain information relating to an organizational idea raised by a user of the client device 212. The client device 212 may include more, fewer, and/or different components than are described herein, in various embodiments.

A technical event associated with the client device 212 may include, for example, a malfunction of hardware and/or software associated with the client device 212. As another example, a technical event associated with the client device 212 may include performance inefficiency of hardware and/or software associated with the client device (e.g., excessive load times or start up times). A technical event that is "associated with" the client device 212 may be an event that originated at the client device 212 itself (e.g., a failure caused by the device's internal hardware or software), or an event that originated elsewhere but still affects performance at the client device 212 (e.g., a malfunction of a server relied upon by a software application that operates at the client device 212). Because root causes of technical events may be distributed among a client device 212 and other devices with which the client device 212 communicates, and because root causes of technical may be unknown at the time at which events are detected, it follows that technical events detected via the client device 212 may include not only those technical events that are caused by problems at the client device 212, but also those technical events that are caused by other devices or systems, but nonetheless impact operation of the client device 212.

The client device 212 may include one or more computer memories 232, which may include one or more non-transitory memories (e.g., ROM) and/or one or more volatile memories (e.g., RAM). The memory 232 may store non-transitory computer-executable instructions that are executable via a processor 236 (i.e., one or more processors, e.g., CPU, GPU, and/or other suitable processing units) to perform the actions of the client device 212 described herein. In particular, the one or more computer memories 232 may store one or more applications 240, including for example an email application, a document creation/processing application, a web browser application, one or more proprietary or third-party business-related applications. Of particular note, the one or more applications 240 include an event capture application 242 ("Event Capture App") as described herein. Each application 240 may include one or more sets of non-transitory computer-executable instructions that, when executed by the processor 236, cause the client device 212 to perform operations associated with the application 240 (e.g., operations involving the processor 236, communications module 244, and/or other suitable components of the client device 212).

The client device 212 may include a display device 256 (i.e., one or more display devices, such as a monitor) and an input device (i.e., one or more user input devices, e.g., a keyboard, a mouse, etc.). In some embodiments, at least some of devices 256 and 258 are integrated (e.g., as a touchscreen with both touch input and display capability). The display device 256 and/or user input device 258 of the client device 212 may be physically included within the client device 212 (e.g., a fixedly installed touchscreen), or may be operatively coupled with the client device 212 by other means (e.g., a mouse, keyboard, or peripheral touchpad connected to the client device 212 by wired or wireless means).

The client device 212 may include a speaker 262, a microphone 264, a camera 266, and/or one or more other sensing components 268 (also referred to herein as "sensors"), such as a positioning unit (e.g., GPS), an accelerometer, a gyroscope, etc. The speaker 262, microphone 264, camera 266, and/or sensors 268 may be physically included within the client device 212 (e.g., a natively installed camera or speaker), and/or may be operatively coupled with the client device 212 by other means (e.g., a peripheral camera, speaker, or microphone connected to the client device 212 by wired and/or wireless means).

Collectively, the display device 256, input device 258, speaker 262, microphone 264, camera 266, and/or sensors 268 may provide one or more user interfaces of the client device 212. For example, the display device 256 may display/present one or more graphical user interfaces, which may include interactive controls that the user can activate via the input device 258 to cause client device functionalities described herein to be performed (e.g., via a touchscreen tap or swipe, a mouse click, a keyboard stroke, etc.). Additionally or alternatively, in some embodiments, similar user interfaces may be provided by the speaker 262, microphone 264, camera 266, and/or sensors 268 (e.g., an interactive audio interface or a gesture-based user interface).

In some embodiments, the user of the client device 212 may "opt-in" to particular data collection functionalities utilizing the microphone 264, camera 266, and/or other sensors 268. For example, the user may opt-in to permit capture of audio and/or video input (e.g., speech and/or gestures) by which the user describes a technical event associated with the client device 212 ("user-generated information," as described herein). In some embodiments, the event capture application 242 may be permitted to capture other sensor information indicative of the event at the client device 212. The event capture application 242 may, for example, obtain information relating to position, movement, and/or acceleration of the client device 212, which may indicate a location or other activity of the client device 212 and/or activity of the user at or before a time at which the technical event was detected.

In some embodiments, the event capture application 242 may operate as a background application at the client device 212. A background application, as referred to herein, is an application that performs at least some operations intermittently or continually without requiring display of a user interface occupying a substantial portion of a visual display of the client device 212, and without otherwise requiring enough computing resources (e.g., RAM and processing power) to substantially delay or interrupt the user's operation of other applications via the client device 212. Background operations of the event capture application 242 at the client device 212 may, for example, continually obtaining and storing at least some system state information of the client device 212. The event capture application 242 may, for example, continually obtain and overwrite a log of stored system state information in a "rolling window" manner, where the window consists of a predetermined amount of time prior to any given current time (e.g., one, five, fifteen, thirty, or sixty minutes prior to the current time).

Accordingly, system-generated information obtained upon detection of a technical event may, in some embodiments include monitored system state information, thereby increasing the amount of information available to the one or more trained artificial neural networks provided herein, and potentially improving the ability of the one or more artificial neural networks to classify technical events (e.g., by improving accuracy of classifications applied by the one or more artificial neural networks, and/or increasing the number of correct classifications applied to a particular technical event).

Example Capture of Information Relating to a Technical Event

FIGS. 5A-5F depict example graphical user interfaces that may be displayed by a display screen 310 of a client device 312, for example by an event capture application executed by the client device 312. The graphical user interfaces of FIGS. 5A-5F include interactive controls by which a user of the client device 312 may provide an indication that a technical event occurred, which in turn may facilitate capture of user-generated information relating to the event (e.g., audio or text provided by the user) and/or system-generated information relating to the technical event (e.g., system state information of the client device 312 and/or other computing entities).

Furthermore, although a desktop computer is portrayed in FIGS. 5A-5F, it should be understood that the client device 312 may be any suitable client device, including those discussed with respect to FIGS. 1 and 4 (client devices 112 and/or 212). Accordingly, the display screen 310 may be, for example, the display device 256 as described with respect to FIG. 4, and user interaction with controls included in the displayed graphical user interfaces may be received via an input 258, microphone 264, camera 266, and/or sensors 268. The event capture application may be, for example, the event capture application 116 or 242 as described with respect to FIGS. 1 and 4, respectively. Although discussion of the client device 312 will focus on the display screen 310, it should be appreciated that the client device 312 may include various additional computing components, including those described herein.

Figure 5A:
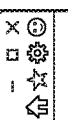
FIGS. 5A-5F illustrate example graphical user interfaces of a client electronic computing device, in accordance with some embodiments.

FIG. 5A depicts an example graphical user interface 324 displayed by the display screen 310. An event capture application at the client device 312 may, for example, cause the graphical user interface 324 to be displayed upon detection of a technical event, or upon the user of the client device 312 interacting with the portion of the screen 310 at which the graphical user interface is displayed (e.g., tapping or moving a mouse to the top portion of the screen 310). Additionally or alternatively, in some embodiments, the screen 310 may continuously display the graphical user interface, and the user may interact with the graphical user interface 324 to indicate that the user has conceived of an organizational idea or encountered a technical event associated with the client device 312.

Still referring to FIG. 5A, the graphical user interface 324 includes interactive controls for (1) automatically obtaining system state information ("Capture"), (2) obtaining audio input from the user ("Audio"), and (3) obtaining text input from the user ("Text"). A user activation of the "Capture" control (e.g., via a user interaction such as a mouse click, touchscreen tap, etc.) may cause the event capture application to automatically obtain system state information associated with the client device 312 (e.g., by retrieving system state information monitored during background operation of the event capture application). Activation of the "Audio" control may cause activation of a microphone of the client device 312 and/or display of one or more additional graphical user interfaces, such that the client device user may provide a spoken description of a technical event and/or an organizational idea. Similarly, activation of the "Text" control may cause display of one or more additional graphical user interfaces to allow the user to provide a written description of the technical event or organizational idea. Examples of such interfaces corresponding to the "Audio" and "Text" controls will be described with respect to FIGS. 5B and 5C, respectively.

Figure 5B:
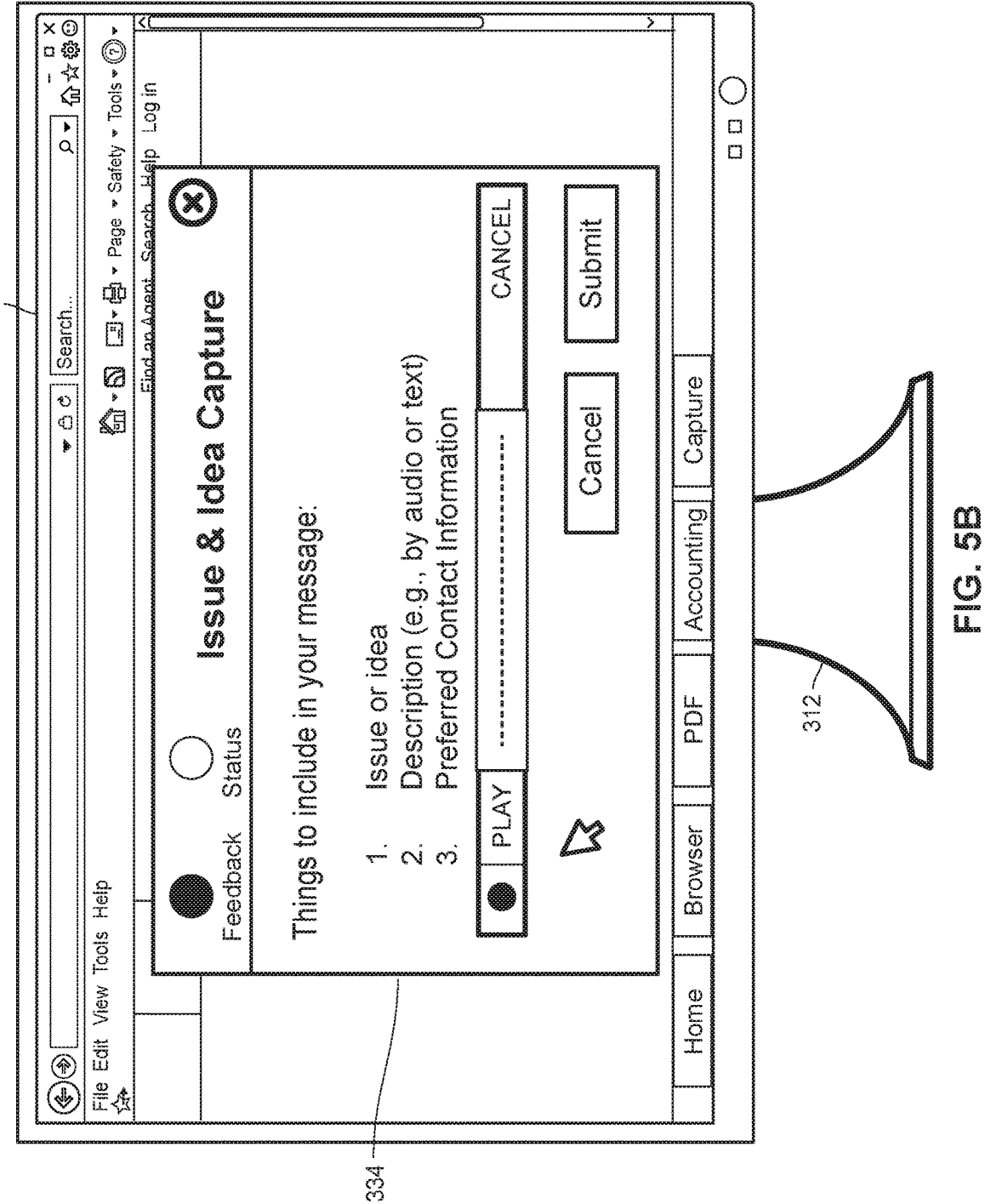

FIG. 5B depicts yet another example graphical user interface 334 displayed by the display screen 310, where the graphical user interface 334 facilitates recording, playback, and submission of user-provided audio describing a technical event or organizational idea. The event capture application may cause the graphical user interface 334 to be displayed, for example, in response to user activation of the "Audio" control of FIG. 5A. In any case, using the graphical user interface 334, the user may describe the technical event as experienced at the client device 312, or the organizational idea. In the case of a technical event, the user may describe, for example, what activities the user was performing at or leading up to the time at which the user noticed the technical event, or how the occurrence of the technical event inhibited use of certain software and/or hardware of the client device 312. Such information may be particularly useful to facilitate diagnosis of a software or hardware malfunction, resolution of a software or hardware malfunction, and/or other classification(s) of the software or hardware malfunction that may assist computing entities and/or staff in resolving the software or hardware malfunction.

Figure 5C:
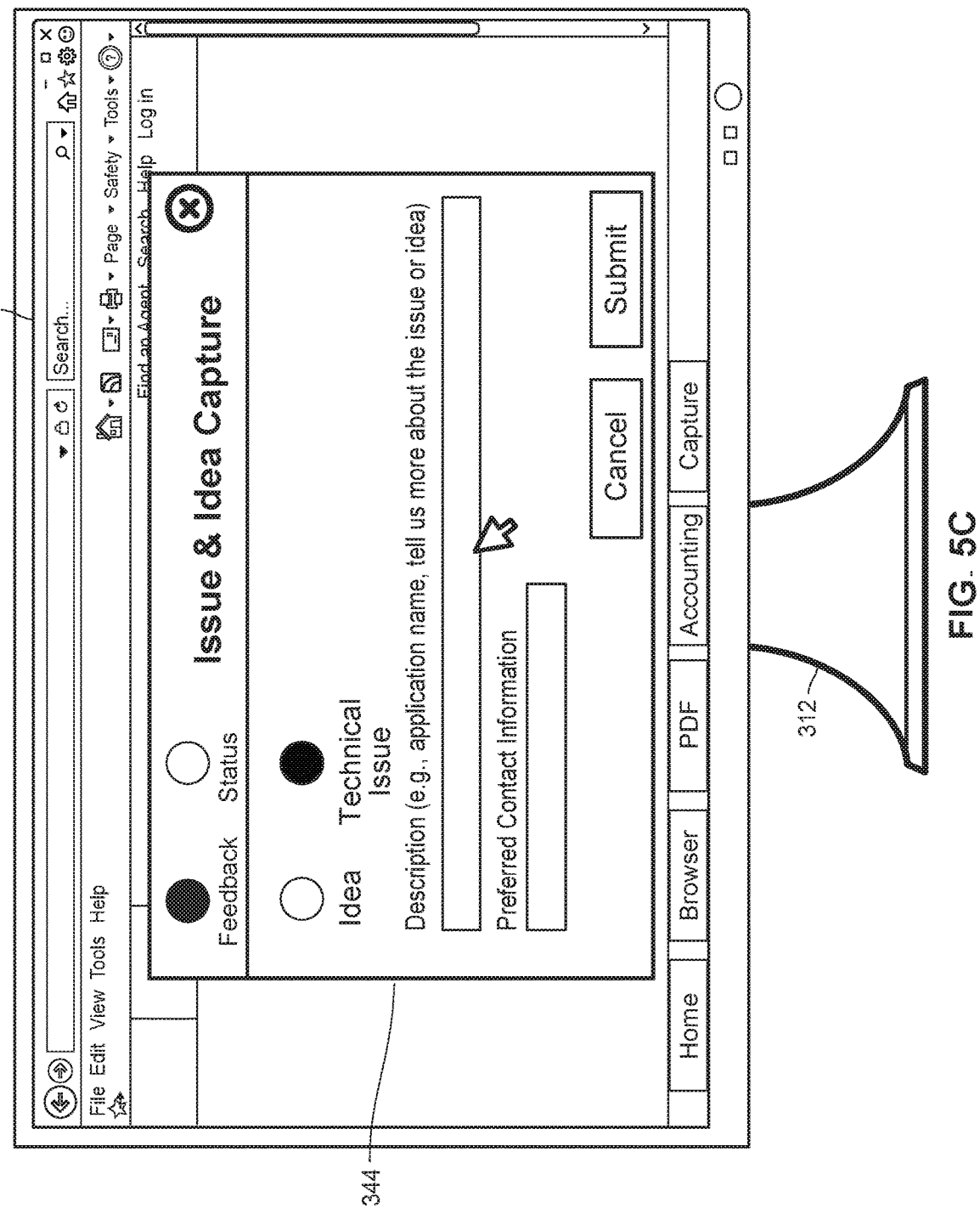

FIG. 5C depicts still another example graphical user interface 344 displayed by the display screen 310, where the graphical user interface 344 facilitates user submission of text describing a technical event or organizational idea. The event capture application may cause the graphical user interface 344 to be displayed, for example, in response to user activation of the "Text" control of FIG. 5A. Alternatively, the event capture application may cause the graphical user interface 344 to be displayed in response to completion of recording of audio as shown in FIG. 5B (e.g., as indicated by user activation of the "Submit" control in FIG. 5B). In any case, text information included in the description of the technical event or organizational idea may be similar to that described above with respect to audio in FIG. 5B, for example. The user may additionally or alternatively use the graphical user interface 344 to provide preferred contact information of the user. In some embodiments, the event capture application may use the user contact information to provide further updates to the user upon analysis of a technical event or organizational idea via the one or more artificial neural networks described herein (e.g., updates regarding diagnoses of a cause of, or remedial steps and/or other steps to be performed for, a technical event).

Figure 5D:
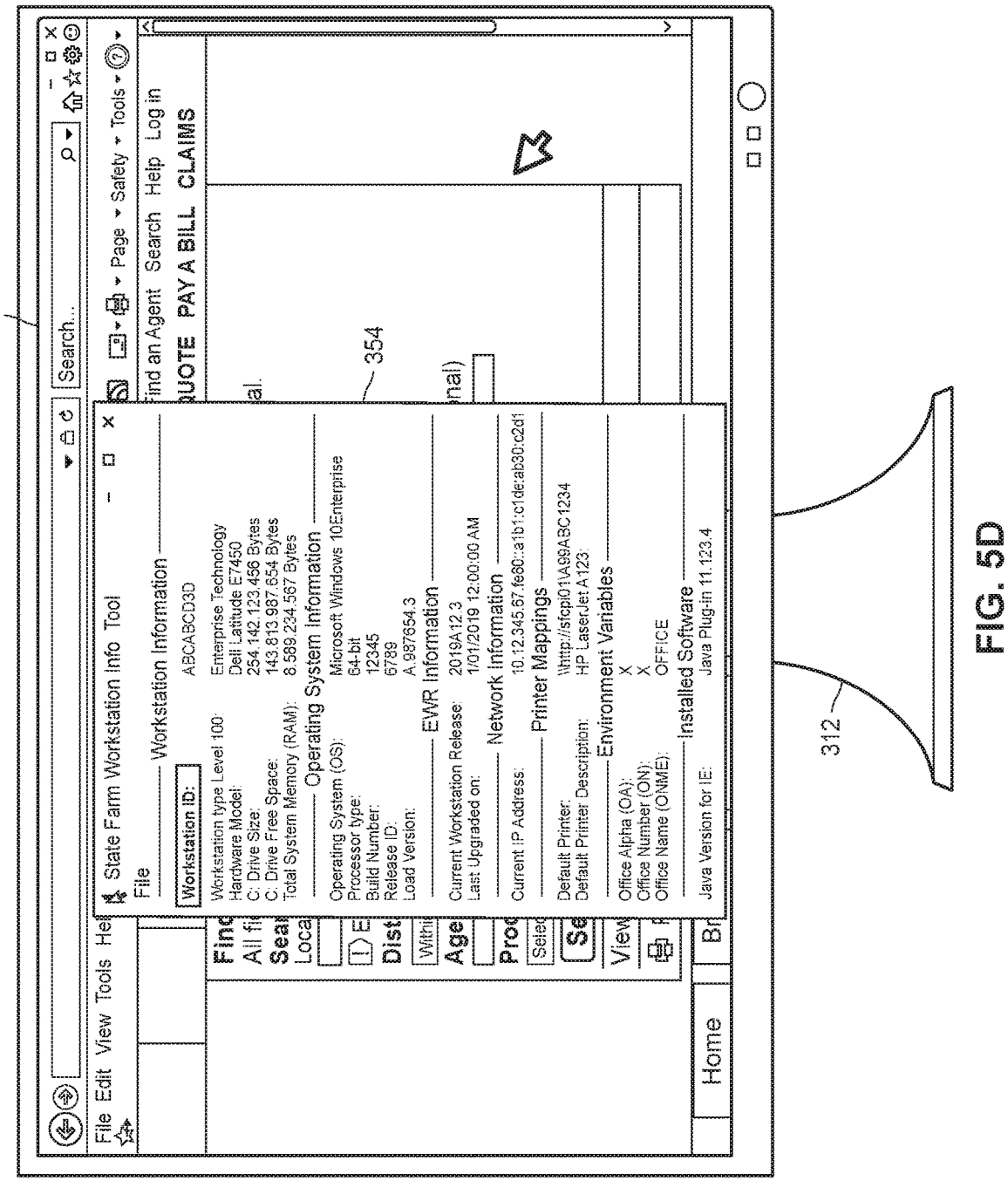
Figure 5E:
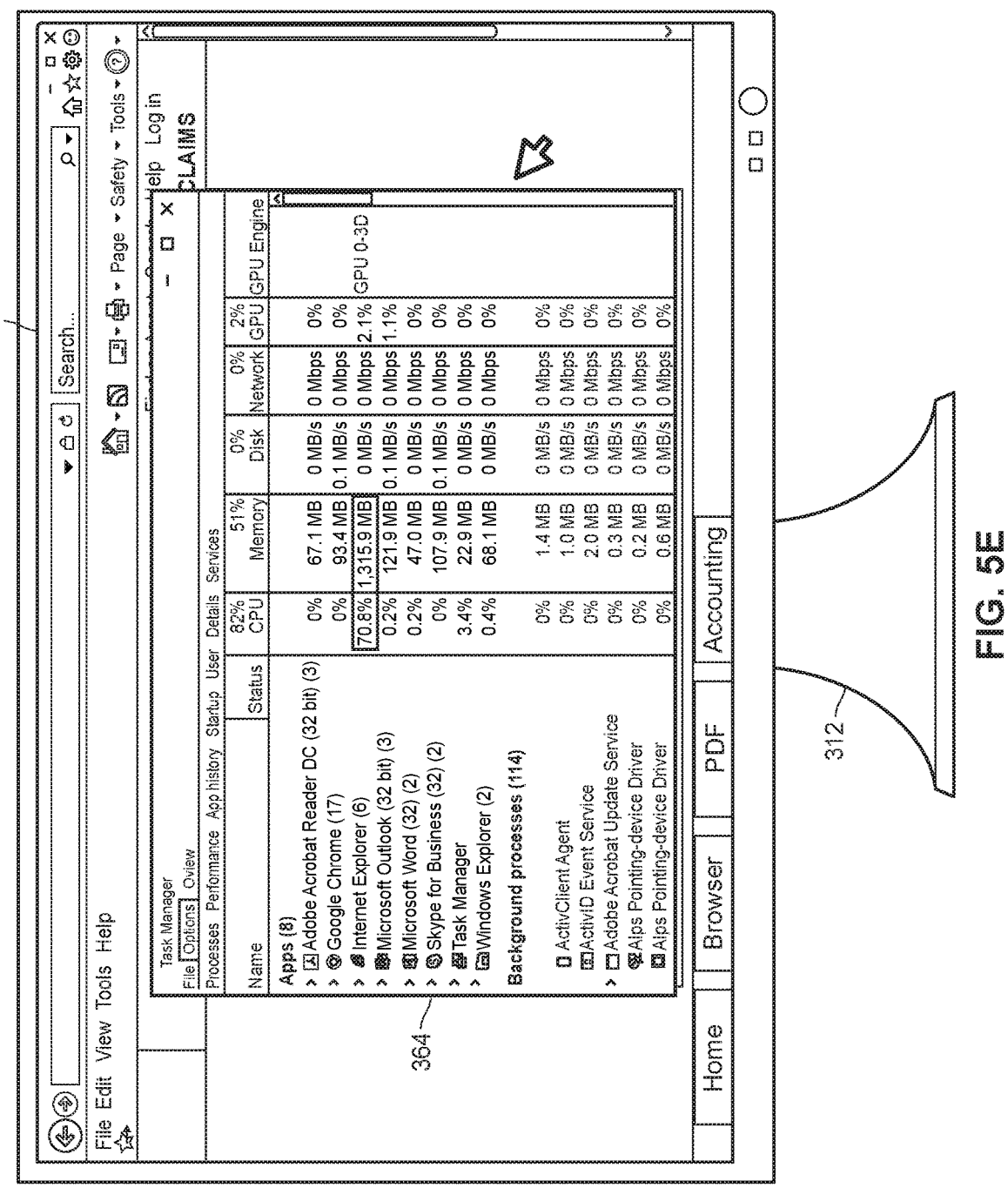

FIGS. 5D and 5E illustrate additional graphical user interfaces 354 and 364, respectively, which may be displayed by the display screen 310 of the client device 312, and which provide examples of system state information that may be obtained by the event capture application, in accordance with various embodiments. Either or both of the graphical user interfaces 354 and/or 364 may, in some embodiments, be accessible by the event capture application as described herein.

Obtained system state information associated with a client device may include various information directly pertaining to the client device 312 itself. Such client device information may include, for example, system date and time, memory usage information (e.g., RAM, ROM, and/or portable memory device usage or capacity), processor usage information (e.g., CPU usage, GPU usage, etc.), operating system information (e.g., OS version, installation date, OS updates, etc.), IP or other network addressing information, information regarding connected peripheral devices (e.g., connected I/O devices, printers, etc.), I/O usage information, and/or application usage information (e.g., usage of processing power or memory by applications, queries made and responses received by applications, etc.). System state information associated with the client device may also include information indicative of communications of the client device 312 over one or more networks (e.g., downloads and/or upload activity, network throughput, sources/destinations of network transmissions, response times from one or more servers, etc.).

System state information associated with a client device may additionally or alternatively include information pertaining specifically to a user of the client device 312. The system state information may include, for example, user account information, user login session information, historical application usage information, user system preferences or application preferences (e.g., settings for applications automatically launched upon client device startup), and/or other information made available by consent of the user of the client device 312. Still further, system state information associated with the client device 312 may include information associated with a physical environment in which the client device 312 operates (e.g., temperature, humidity, and/or power usage in the environment).

In some embodiments, system state information associated with the client device 312 may include information indicative of operations of other computing entities in an organizational computing system in which the client device operates. Such other computing entities may include, for example, one or more routers, modems, firewalls, servers, and/or other suitable computing entities including those described herein. As just one example, a detected technical event may relate to a particular software application served by one or more application servers within the organization. Accordingly, a particular back-end server communicating with the client device 312 to capture the event may also communicate with the application server(s) to obtain state information of the application server(s). This remote or "non-client" system state information may correspond to operation of the server and the particular software application at the time at which the technical event was detected, before the time of detection, and/or after the time of detection. In various embodiments, similar techniques may be implemented with respect to obtaining system state information associated with particular routers, modems, firewalls, other client devices, etc.

Various other system state information may also, or instead, be obtained via the event capture application, in accordance with the systems and methods described herein.

Captured information, including user-generated information and/or system-generated information, may be provided as inputs to the one or more trained artificial neural networks, as will be described in the subsequent section of this detailed description. Accordingly, the one or more artificial neural networks may analyze a technical event or organizational idea based at least in part upon the inputs.

Figure 5F:
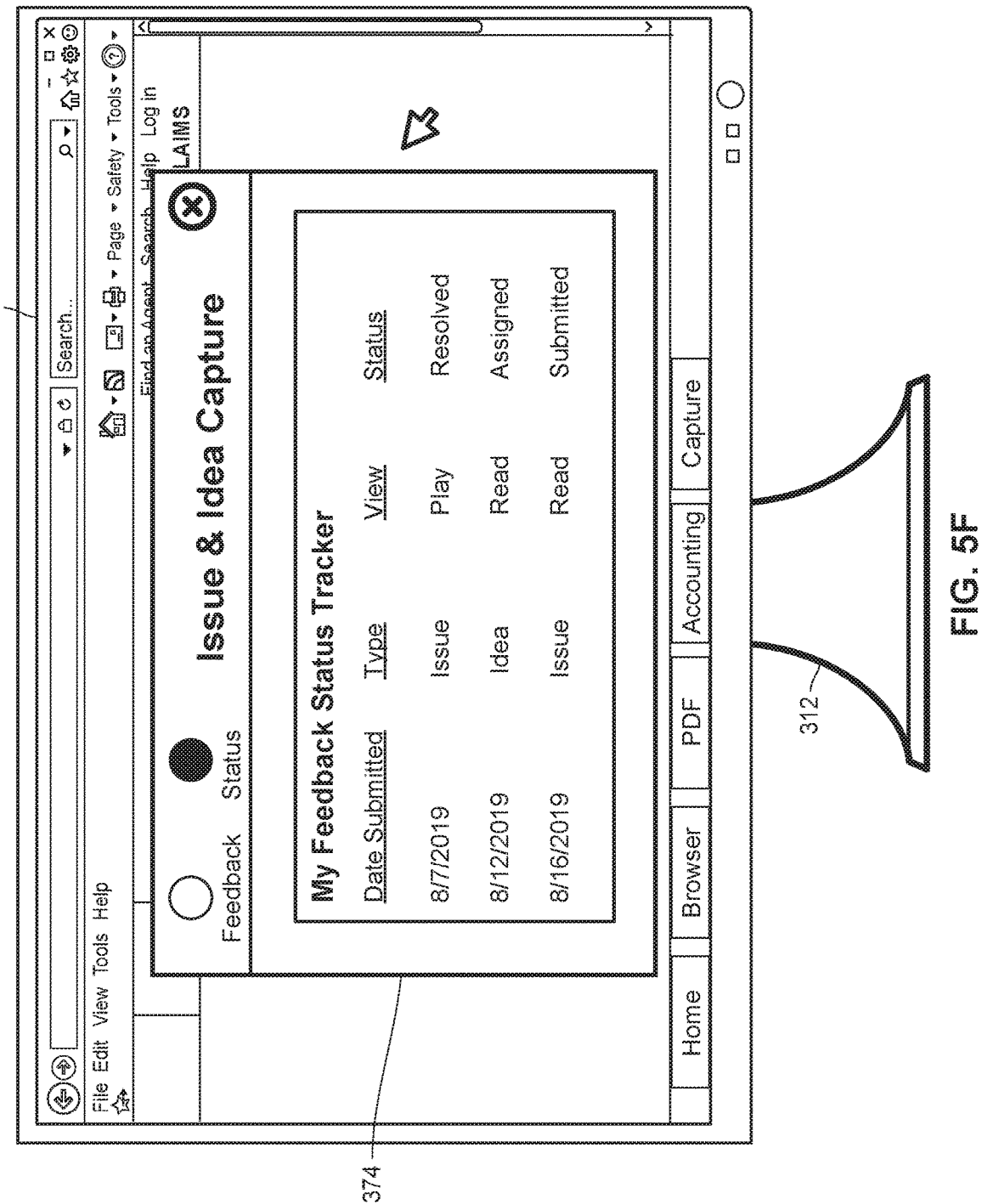

The user of the client device 312 may be interesting in following up on a reported technical event or organizational idea, for example to view an indication of whether a technical event has been resolved and/or steps in response thereto have been identified, or to view an indication of whether an organizational idea has been provided to a particular portion of the organization (e.g., an organizational team assigned to handle particular software ideas, business process ideas, etc.). FIG. 5F depicts another example graphical user interface 374 displayed by the display screen 310, where the graphical user interface 374 facilitates the client device user's viewing of information related to technical events, and/or organizational ideas, previously reported via the user. For each event, the user may, for example, view the submission date, the type of event, the actual information submitted (e.g., "Play" submitted audio/video or "Read" submitted text), and/or a status of the submitted event (e.g., indicating whether back-end computing entities or staff have diagnosed or resolved a technical event or taken action on an organizational idea submitted by the user).

Status of the submitted technical event or organizational idea as shown in FIG. 5F may be based at least in part upon one or more outputs of the artificial neural network(s) upon analyzing the technical event or organizational idea (e.g., "resolved" based upon one or more artificial neural networks classifying a cause of a technical event and/or steps to be performed based upon the technical event, or "assigned" based upon one or more artificial neural networks routing a technical event or organizational idea to another server, workstation, and/or staff). In some embodiments, the graphical user interface 374 may facilitate viewing of additional information associated with a technical event (e.g., more detailed information identifying a diagnosed technical event, and/or instructions for resolving a root cause of the technical event).

Still referring to FIG. 5F, the graphical user interface 374 may, in some embodiments, facilitate the addition or editing of previously provided contextual information (e.g., adding audio and/or text after initial submission of the event information). This functionality may be particularly useful if, for example, the client device user is not able to provide contextual information until a time substantially after the detection of a technical event and after the collection and transmission of system state information.

Various other user interfaces of the event capture application may be envisioned. Particularly, modifications to the user interfaces described above may be made to suit other input and/or display devices of the client devices 312. For example, audio interfaces may receive user audio input and/or play audio output to perform the functionalities described above via audio interactions instead of visual interactions. As another example, if the client device user has opted-in recording of video by a camera of the client device 312, the event capture application may cause one or more user interfaces to be displayed, via which the user can record, play back, and submit video of the user while he or she describes the technical event or organizational idea.

Example Elements of an Artificial Neural Network

Figure 6:
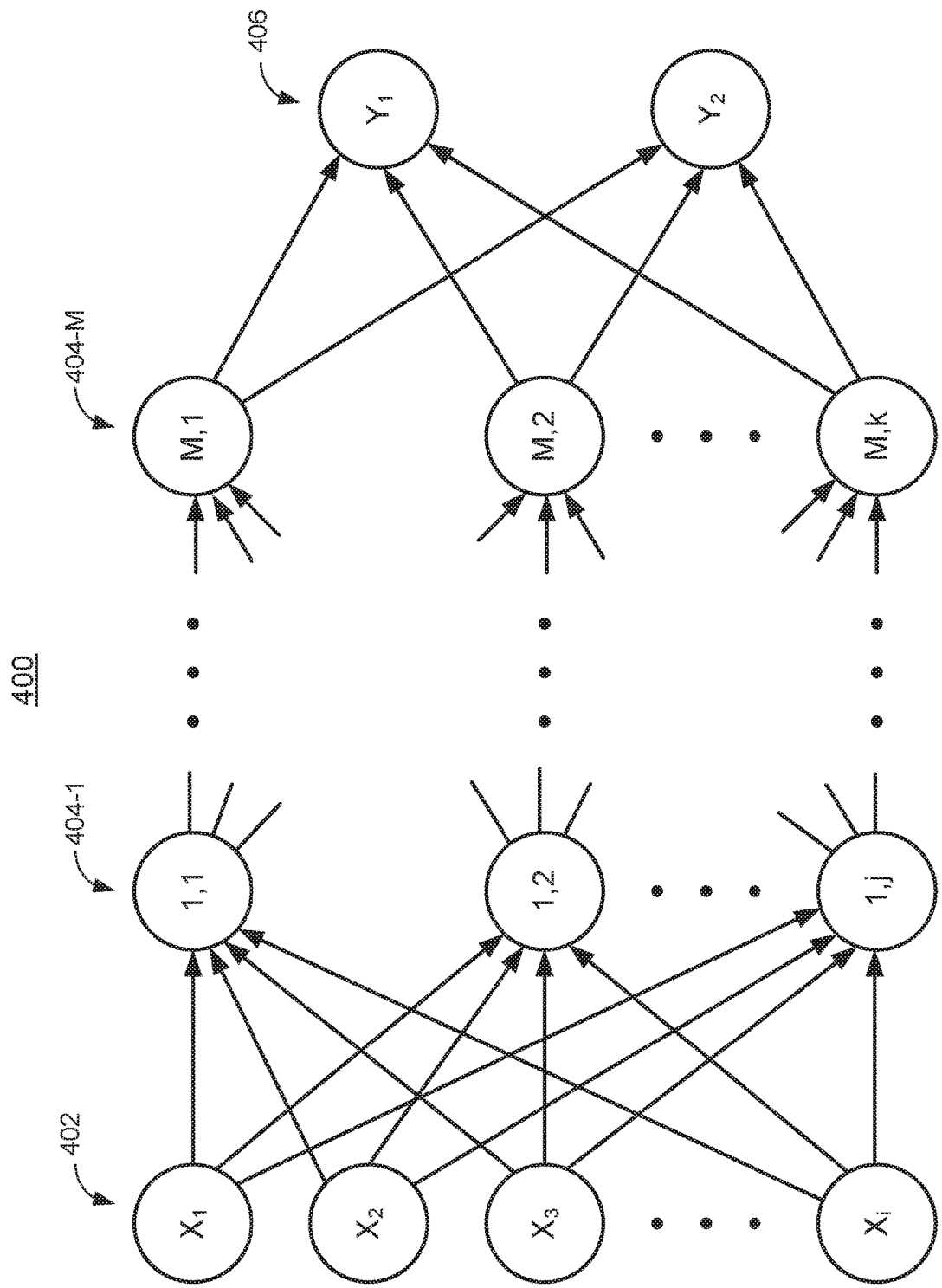
FIG. 6 illustrates an example artificial neural network that may be trained to classify technical events, in accordance with some embodiments.

FIG. 6 depicts elements an example artificial neural network 400 that may be trained to classify technical events and/or organizational ideas (e.g., the artificial neural network 122 or another artificial neural network described with respect to FIGS. 1, 2A, and/or 2B). The neural network 400 may be trained, for example, by the routing server(s) 120 of FIG. 1, and/or by other computing entities described herein.

The neural network 400 includes a multiplicity of neurons arranged in multiple layers, and includes an input layer 402, one or more intermediate layers 404-1 through 404-M ("hidden layer(s)"), and an output layer 406. M may be any integer greater than or equal to one. Each of the layers 402, 404-1 through 404-M, and 406 may have any number of inputs/neurons/outputs (e.g., the layer 404-1 including neurons "1, 1" through "1, j," wherein j represents the number of neurons in layer 404-1). Each layer may have same or different numbers of inputs/neurons/outputs. Various other configurations of the neural network 400 are possible.

Inputs included in the input layer 402 may correspond to respective portions of information relating to a technical event. As an example, an input to one or more artificial neural networks for classifying a technical event may include a parameter value of system-generated information associated with the client device (e.g., percentage of CPU usage by the client device at the time of the technical event, an indication of an application being used by the client device user at or near the time of the technical event, and/or other portions of system state information described herein). As another example, an input to one or more artificial neural networks for classifying a technical event may include a portion of user-generated text or audio describing the contextual event (e.g., a keyword included in the text or audio, or determination of user sentiment based upon the user-generated audio). As yet another example, an input to one or more artificial neural networks for classifying an organizational idea may include a portion of user-generated text or audio describing the contextual event (e.g., a keyword included in the text or audio).

Training of the neural network 400 may be achieved via providing "labeled training data" to the neural network 400. Labeled training data generally includes information relating to technical events and/or organizational ideas ("inputs") having known classifications ("outputs," e.g., known sources of a technical event, entities to which to route a technical event or organizational idea, etc.). Effectively, the labeled training data includes inputs that are "labeled" with known outputs, and the neural network 400 is trained to produce correct outputs (e.g., produce classifications at or above a particular rate of accuracy) based upon the training data inputs.

In some embodiments, the number of inputs used by the neural network 400 during training may be greater than the number of inputs used by the neural network 400 after training. For example, some system state information used as inputs may be found to not correlate particularly strongly to any one classification of technical event, and thus those inputs are not used in the trained neural network 400.

Each of the intermediate layers 404-1 through 404-M may include any number of neurons, and a different number of neurons at each layer is possible. Each intermediate layer neuron may operate on one or more inputs from the input layer 402 and/or one or more outputs of other layers (e.g., a preceding intermediate layer), to generate a decision or other output.

The output layer 406 may include outputs $y_1$ and $y_2$. Additional outputs are possible, in various embodiments. In any case, each output of the neural network 400 may correspond to a classification of a technical event (e.g., a priority level, a reach of the technical event across the organization, a source of the technical event, a remedial step, an identification of additional diagnostic information required for analysis, etc.) or a classification of an organizational idea (e.g., a particular hardware device or business process associated with the idea, etc.) based upon corresponding input(s) $x_1$ through $x_j$. It should be noted that, in some embodiments, an output of the neural network 400 may be obtained not just from the output layer 406, but also from one or more of the intermediate layers 404-1 through 404-M.

In some embodiments, the neural network 400 may be a recurrent neural network, wherein decisions or outputs from at least one layer of the neural network 400 are fed back to at least one previous layer during training to provide an indication of significance (e.g., a "weight") of a particular input or intermediate layer output in determining a particular decision or calculation. For example, outputs of an intermediate layer 404 and/or output layer 406 may be utilized to weight input metrics at the input layer 402. As a result of training, in some embodiments, insignificant inputs of inputs 402, and/or insignificant neurons of layers 404-1 through 404-M, may be bypassed in order to reduce processing demands in determining classifications.

According to techniques described herein, information relating to a technical event or an organizational idea may be provided to the trained neural network 400. The information relating to the technical event or organizational idea may be provided, for example, via a client device executing an event capture application as described herein. The trained neural network 400 may process at least a portion of the obtained information relating to the technical event or organizational idea (e.g., as inputs to the trained neural network 400) to determine one or more classifications of the technical event or organizational idea (e.g., based upon outputs of the trained neural network 400).

Figure 7:
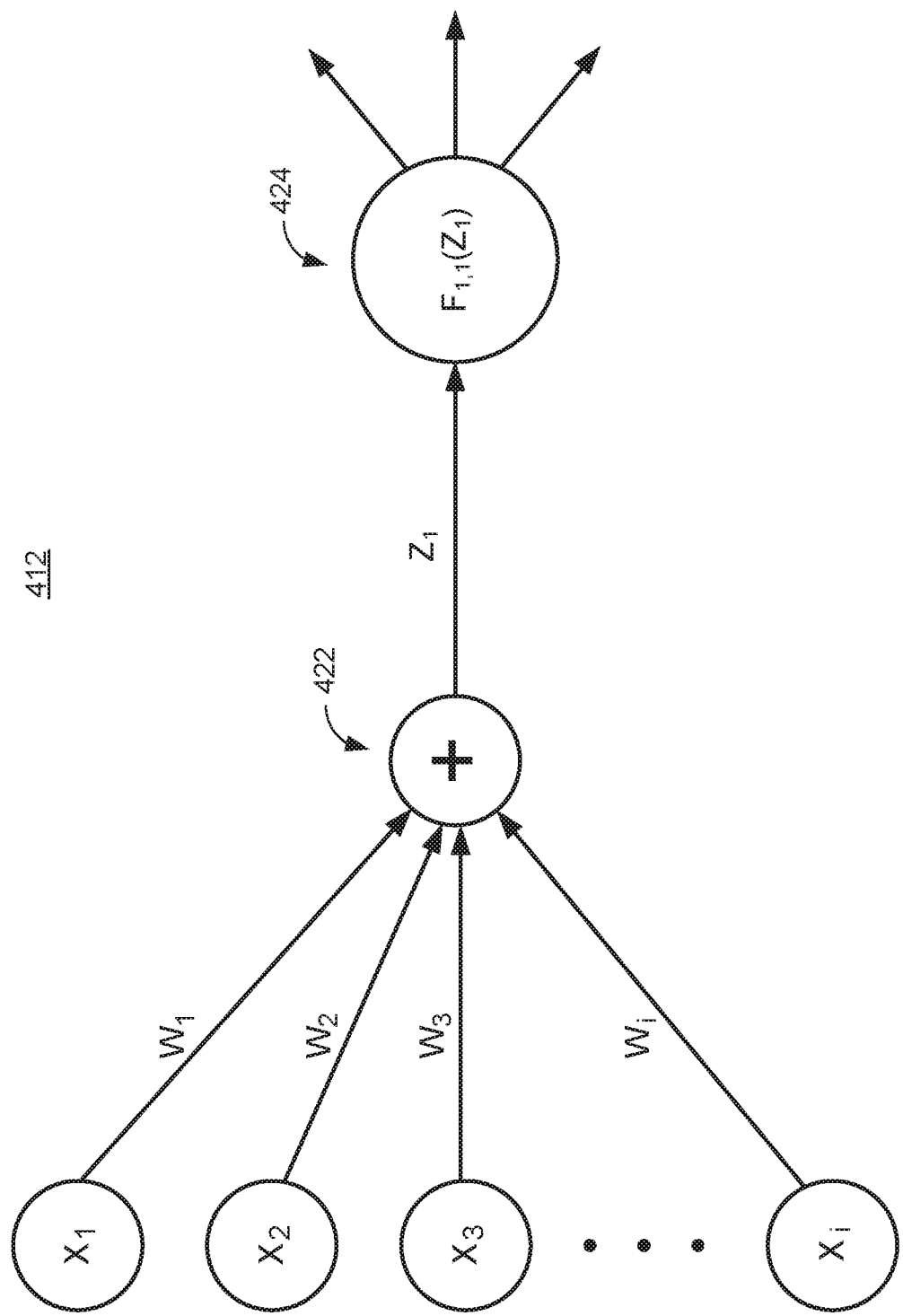
FIG. 7 illustrates an example artificial neural network neuron that may be included in the artificial neural network of FIG. 6, in accordance with some embodiments.

FIG. 7 depicts an example neuron 412 that may correspond to a particular neuron of the neural network 400 of FIG. 6 (e.g., a neuron "1, 1" of the layer 404-1). At least one of inputs $x_1$ through $x_j$ may be provided to the neuron 412. A particular input may be, for example, an input to the neural network 400 itself as described with respect to FIG. 6, or an output of a neuron of another layer of the neural network 400. Each input may be assigned a respective weight ($W_1$ through $W_j$), wherein the weight of each input may be determined during the process of training the neural network 400. In some cases, an input may be determined to be insignificant to a decision or calculation of a neuron, and may accordingly be assigned a zero or near-zero weight.

The weighted inputs $x_1$ through $x_j$ may be provided to a summing node 422 of the neuron 412. A sum of the weighted inputs, $z_1$, may be provided as an input to a function 424, labeled in FIG. 7 as $F_{1.1}$ ($z_1$). The function 424 may represent any suitable linear or non-linear operation on $z_1$. As shown in FIG. 7, an output of function 424 may be provided to a number of neurons of the next layer, and/or may be provided as an output of neural network 400.

In other embodiments, and/or in other training scenarios, the neuron 412 may be arranged differently than is shown in FIG. 7. For example, the summing node 422 may be omitted, and the function 424 may operate directly on one or more of the inputs $x_1$ through $x_j$. As another example, the neuron 412 may not apply weights to any of the inputs $x_1$ through $x_j$ (e.g., equal weight may be applied to all inputs).

Example Computer-Implemented Methods

Figure 8:
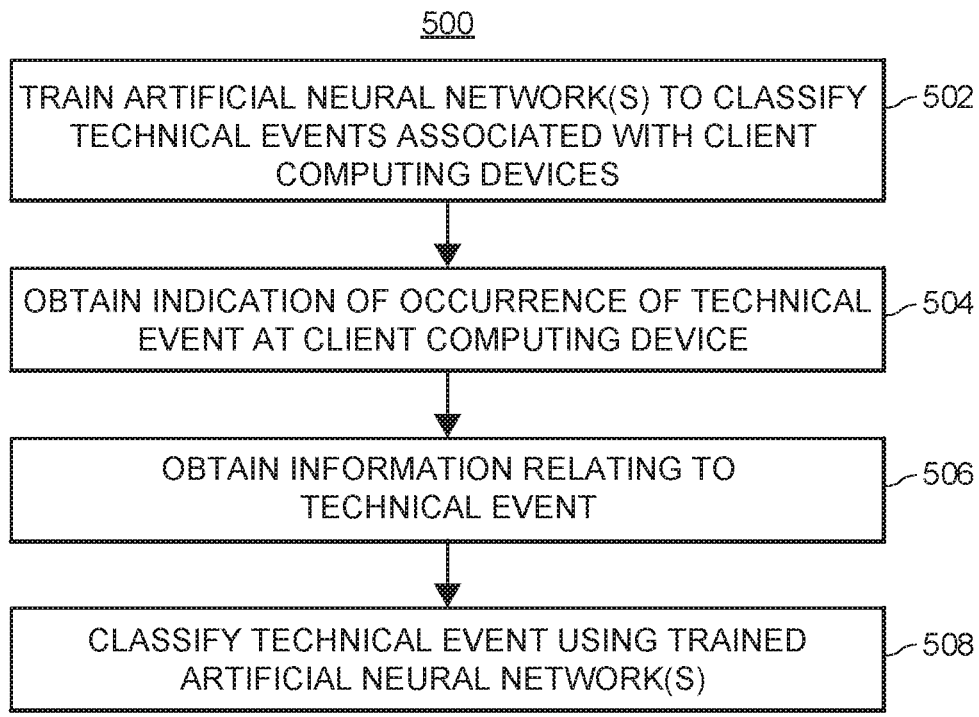
FIG. 8 illustrates an example computer-implemented method for analyzing a technical event, in accordance with some embodiments.

FIG. 8 illustrates a flow diagram of an example computer-implemented method 500 for analyzing information relating to a technical event associated with a client electronic computing device ("client device"). The technical event may include, for example, a software application malfunction or a hardware malfunction originating at the client device, or otherwise affecting the client device (e.g., originating at or caused by another computing entity with which the client device communicates). Additionally or alternatively, the technical event may include a performance inefficiency of a software application or hardware component, the inefficiency being detectable by the client device user (e.g., excessive times to send or receive communications with other computing entities, long times to load web pages, etc.).

The method 500 may be implemented, for example, by one or more servers described with respect to FIGS. 1, 2A, and/or 2B (e.g., by the routing server(s) 120 and/or technical support server(s) 124). The server(s) may include one or more processors and one or more memories storing non-transitory computer-executable instructions that, when executed, cause the server(s) to perform actions of the method 500. In some embodiments, non-transitory computer-executable instructions may be stored by one or more non-transitory computer-readable media (e.g., one or more memories of server(s) 120 and/or 124), where the instructions are executable by one or more processors to cause one or more computers to perform actions of the method 500.

The example method 500 includes training one or more artificial neural networks to classify technical events (502). Particularly, the one or more artificial neural networks may be trained to classify technical events based upon (1) user-generated information relating to technical events (e.g., audio, text, and/or other information describing the technical event as experienced by a user), and/or (2) system-generated information relating to technical events (e.g., system state information of a client device and/or other devices associated with the technical event). The training of the one or more artificial neural networks may be performed using labeled training data indicative of past technical events associated with client devices (e.g., software malfunctions, hardware malfunctions, and/or performance efficiencies with known classifications).

Classifications of a technical event may include, for example, (1) an identification source or cause of the technical event (e.g., an issue with hardware or software of the client device or another particular computing entity in the organization), (2) an identification of one or more steps to be performed based upon the technical event (e.g., remedial steps to be taken at client devices to resolve a hardware/software issue), (3) an identification of another computing entity to which information relating to the technical event is to be directed (e.g., another server or workstation best equipped to handle the technical event), (4) an identification of additional information required to further analyze the technical event (e.g., additional diagnostic information from other client devices, servers, network equipment, etc.), (5) a determination of a reach of the issue in the organization (e.g., a number of other client devices, servers, and/or network hardware affected by the technical event), and/or (6) a priority of the technical event.

The method 500 further includes obtaining an indication of an occurrence of a technical event associated with a client computing device (504). The client computing device ("client device") may be, for example, a client device as described with respect to FIGS. 1, 3, and/or 5A-5F (e.g., client device 112, 212, or 312). The indication of the occurrence of the technical event may be obtained, for example, via an event capture application executing at the client device.

The method 500 additionally includes obtaining information relating to the technical event (506). The information relating to the technical event may be obtained based upon (e.g., in response to) obtaining the indication of the occurrence of the technical event. In some embodiments, at least some of the information relating to the technical event may be obtained immediately in response to obtaining the indication of the occurrence of the technical event (e.g., automatically capturing system state information). Obtained information may include, for example, (1) information generated automatically by the client device (e.g., system state information), (2) system state information generated by other computing entities (e.g., servers, network hardware, etc.), and/or (3) information generated by a user of the client computing device (e.g., audio and/or text description of the technical event, provided by the user).

The example method 500 still further includes determining one or more classifications of the technical event, at least by processing the obtained information using the one or more trained artificial neural networks (508). In some embodiments, determining the one or more classifications includes identifying additional information required to further analyze the technical event. In these embodiments, the method 500 may further include obtaining the required information and processing the additional obtained information using the one or more artificial neural networks, to thereby produce one or more additional classifications of the technical event.

The method 500 may include additional, fewer, and/or alternate actions, in various embodiments. For example, in some embodiments, the method 500 may include routing information relating to the technical event (e.g., at least some of the user-generated and/or system-generated information obtained at action 506, and/or at least one classification determined at action 508) to one or more other computing entities. For example, information relating to the technical event may be routed to one or more additional servers and/or workstations (e.g., servers/workstations associated with particular organizational teams, as shown in FIG. 2A). In some embodiments, the one or more other computing entities may receive information relating to the technical event, and analyze the received information (e.g., process the information using an additional trained artificial neural networks) to determine one or more additional classifications of the technical event.

Figure 9:
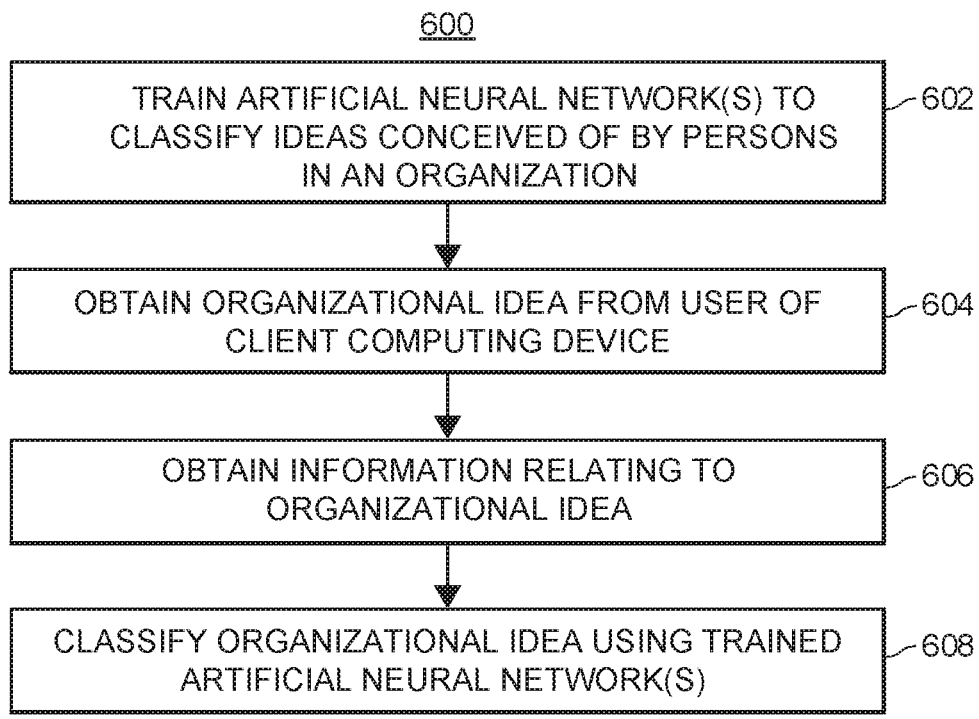
FIG. 9 illustrates another example computer-implemented method for analyzing an organizational idea, in accordance with some embodiments.

FIG. 9 illustrates a flow diagram of an example computer-implemented method 600 for analyzing information relating to an organizational idea conceived of by a client device user in an organization. An organizational idea may include, for example, an improvement to software utilized by the organization, hardware utilized by the organization, and/or business processes utilized by the organization.

The method 600 may be implemented, for example, by one or more servers described with respect to FIGS. 1, 2A, and/or 2B (e.g., by the routing server(s) 120). The server(s) may include one or more processors and one or more memories storing non-transitory computer-executable instructions that, when executed, cause the server(s) to perform actions of the method 600. In some embodiments, non-transitory computer-executable instructions may be stored by one or more non-transitory computer-readable media (e.g., one or more memories of server(s) 120 and/or 124), where the instructions are executable by one or more processors to cause one or more computers to perform actions of the method 600.

The example method 600 includes training one or more artificial neural networks to classify organizational ideas (602). Particularly, the one or more artificial neural networks may be trained to classify organizational ideas based upon user-generated information relating to organizational ideas (e.g., audio, text, and/or other user-provided information describing the idea). The training of the one or more artificial neural networks may be performed using labeled training data indicative of past organizational ideas (e.g., ideas with known classifications). Classifications of an organizational idea may include, for example, (1) an identification of a software product, hardware device, and/or business process that can be improved by the organizational idea, and/or (2) an identification of another computing entity to which information relating to the organizational idea is to be directed (e.g., another server or workstation best equipped to handle the organizational idea).

The method 600 further includes obtaining an indication of an organizational idea conceived of by a user of a client computing device (604). The client computing device ("client device") may be, for example, a client device as described with respect to FIGS. 1, 4, and/or 5A-5F (e.g., client device 112, 212, or 312). The indication of the organizational idea may be obtained, for example, via an event capture application executing at the client device.

The method 600 additionally includes obtaining information relating to the organizational idea (606). The information relating to the organizational idea may be obtained based upon (e.g., in response to) obtaining (at action 604) the indication of the organizational idea. Information relating to the organizational idea may include information provided by a user of the client computing device (e.g., audio and/or text description of the idea, provided by the user via the event capture application).

The example method 600 still further includes determining one or more classifications of the organizational idea, at least by processing the obtained information using the one or more trained artificial neural networks (608).

The method 600 may include additional, fewer, and/or alternate actions, in various embodiments. For example, in some embodiments, the method 600 may include routing information relating to the organizational idea (e.g., at least some of the user-provided information obtained at action 606, and/or at least one classification determined at action 608) to one or more other computing entities. For example, information relating to the organizational idea may be routed to one or more additional servers and/or workstations (e.g., servers/workstations associated with particular organizational teams, as shown in FIG. 2B). In some embodiments, the one or more other computing entities may receive information relating to the organizational idea, and analyze the received information (e.g., process the information using an additional trained artificial neural network) to determine one or more additional classifications of the organizational idea.

Additional Considerations

Although the preceding text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the one or more processors or processor-implemented modules may be located in a single geographical location (e.g., within a home environment, an office environment, or a server farm). In other example embodiments, the one or more processors or processor-implemented modules may be distributed across a number of geographical locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the terms "coupled," "connected," "communicatively connected," or "communicatively coupled," along with their derivatives. These terms may refer to a direct physical connection or to an indirect (physical or communication) connection. For example, some embodiments may be described using the term "coupled" to indicate that two or more elements are in direct physical or electrical contact. The term "coupled," however, may also mean that two or more elements are not in direct contact with each other, but yet still co-operate or interact with each other. Unless expressly stated or required by the context of their use, the embodiments are not limited to direct connection.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless the context clearly indicates otherwise.

Upon reading this disclosure, those of skill in the art will appreciate still additional alternative structural and functional designs for systems and methods through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

Finally, the patent claims at the end of this patent application are not intended to be construed under 35 U.S.C. § 112 (f), unless traditional means-plus-function language is expressly recited, such as "means for" or "step for" language being explicitly recited in the claims. The systems and methods described herein are directed to an improvement to computer functionality, and improve the functioning of conventional computers.

What is claimed:

1. A computer-implemented method for analyzing information relating to a technical event associated with a client computing device, the method comprising:

training, by one or more processors and using labeled training data, one or more artificial neural networks to classify technical events based upon at least one of user-generated information or system-generated information associated with the technical events, wherein the labeled training data includes data indicative of past technical events and known classifications of the past technical events;

obtaining, by the one or more processors and via an event capture application executing at a client computing device, an indication that a technical event has occurred, the technical event being associated with the client computing device and comprising a hardware or software malfunction;

responsive to obtaining the indication that the technical event has occurred, obtaining, by the one or more processors, information relating to the technical event, the obtained information including information generated by at least one of (i) the client computing device or (ii) a user of the client computing device; and determining, by the one or more processors, one or more classifications of the technical event, at least by processing the obtained information using the one or more trained artificial neural networks.

2. The computer-implemented method of claim 1, wherein determining the one or more classifications of the technical event includes determining a cause or source of the technical event.

3. The computer-implemented method of claim 1, wherein determining the one or more classifications of the technical event includes identifying one or more steps to be performed by one or more persons associated with the client computing device.

4. The computer-implemented method of claim 1, wherein determining the one or more classifications of the technical event includes determining, from among a plurality of other computing entities configured to perform further processing of information relating to technical events, one or more other computing entities to which the information relating to the technical event are to be transmitted, and wherein the method further comprises causing, by the one or more processors, the information relating to the technical event to be transmitted to the one or more other computing entities.

5. The computer-implemented method of claim 1, wherein determining one or more classifications of the technical event includes identifying additional information relating to the technical event to be obtained, and wherein the method further comprises:
obtaining, by the one or more processors, the identified additional information relating to the technical event; and
determining, by the one or more processors, one or more additional classifications of the technical event, at least by processing the obtained additional information using one or more trained artificial neural networks.

6. The computer-implemented method of claim 1, wherein obtaining the information relating to the technical event comprises, upon obtaining the indication of the technical event, causing the client computing device to automatically (i) obtain system state information associated with the client computing device, and (ii) transmit the obtained system state information to one or more servers via one or more computing networks.

7. The computer-implemented method of claim 1, wherein determining the one or more classifications of the technical event includes identifying one or more additional client computing devices affected by the occurrence of the technical event.

8. The computer-implemented method of claim 1, wherein determining the one or more classifications of the technical event includes determining a priority level corresponding to the technical event.

9. A computing system configured to analyze information relating to a technical event associated with a client computing device, the computing system comprising:
one or more processors; and
one or more memories storing non-transitory computer executable instructions that, when executed by the one or more processors, cause the computing system to:
train, using labeled training data, one or more artificial neural networks to classify technical events based upon at least one of user-generated information or system-generated information associated with the technical events, wherein the labeled training data includes data indicative of past technical events and known classifications of the past technical events;
obtain, via an event capture application executing at a client computing device, an indication that a technical event has occurred, the technical event being associated with the client computing device and comprising a hardware or software malfunction;
responsive to obtaining the indication that the technical event has occurred, obtain information relating to the technical event, the obtained information including information generated by at least one of (i) the client computing device or (ii) a user of the client computing device; and
determine one or more classifications of the technical event, at least by processing the obtained information using the one or more trained artificial neural networks.

10. The computing system of claim 9, wherein the one or more classifications of the technical event include a cause or source of the technical event.

11. The computing system of claim 9, wherein the one or more classifications of the technical event include an identification of one or more steps to be performed by one or more persons associated with the client computing device.

12. The computing system of claim 9, wherein the one or more classifications of the technical event include a determination of, from among a plurality of other computing entities configured to perform further processing of information relating to technical events, one or more other computing entities to which the information relating to the technical event are to be transmitted,
and wherein non-transitory computer executable instructions further include instructions that, when executed by the computing system, cause the computing system to transmit the information relating to the technical event to the one or more other computing entities.

13. The computing system of claim 9, wherein the one or more classifications of the technical event include an identification of additional information relating to the technical event to be obtained, and wherein non-transitory computer executable instructions further include instructions that, when executed by the computing system, cause the computing system to:
obtain the identified additional information relating to the technical event; and
determine one or more additional classifications of the technical event, at least by processing the obtained additional information using the one or more trained artificial neural networks.

14. The computing system of claim 9, wherein the instructions to obtain the information relating to the technical event comprise instructions to, upon obtaining the indication of the technical event, cause the client computing device to automatically (i) obtain system state information associated with the client computing device, and (ii) transmit the obtained system state information to one or more servers via one or more computing networks.

15. The computing system of claim 9, wherein the one or more classifications of the technical event include an identification of one or more additional client computing devices affected by the occurrence of the technical event.

16. The computing system of claim 9, wherein the one or more classifications of the technical event include a priority level associated with the technical event.

17. One or more non-transitory computer readable media storing non-transitory computer executable instructions that, when executed by one or more processors, cause one or more computers to:

train, using labeled training data, one or more artificial neural networks to classify technical events based upon at least one of user-generated information or system-generated information associated with the technical events, wherein the labeled training data includes data indicative of past technical events and known classifications of the past technical events;

obtain, via an event capture application executing at a client computing device, an indication that a technical event has occurred, the technical event being associated with the client computing device and comprising a hardware or software malfunction;

responsive to obtaining the indication that the technical event has occurred, obtain information relating to the technical event, the obtained information including information generated by at least one of (i) a client computing device or (ii) a user of the client computing device; and determine one or more classifications of the technical event, at least by processing the obtained information using the one or more trained artificial neural networks.

18. The one or more non-transitory computer readable media of claim 17, wherein the one or more classifications of the technical event include a cause or source of the technical event.

19. The one or more non-transitory computer readable media of claim 17, wherein the one or more classifications of the technical event include a determination of, from among a plurality of other computing entities configured to perform further processing of information relating to technical events, one or more other computing entities to which the information relating to the technical event are to be transmitted, and wherein non-transitory computer executable instructions further include instructions that, when executed by the computing system, cause the one or more computers to transmit the relating to the technical event to the one or more other computing entities.

20. The one or more non-transitory computer readable media of claim 17, wherein the one or more classifications of the technical event include an identification of additional information relating to the technical event to be obtained, and wherein non-transitory computer executable instructions further include instructions that, when executed by the one or more processors, cause the one or more computers to:

obtain the identified additional information relating to the technical event; and determine one or more additional classifications of the technical event, at least by processing the obtained additional information using the one or more trained artificial neural networks.

* * * * *